United States Patent [19]
Wada et al.

[11] Patent Number: 5,949,922
[45] Date of Patent: Sep. 7, 1999

[54] IMAGE READING APPARATUS

[75] Inventors: Shinichiro Wada, Kanagawa; Koichi Noguchi, Tokyo; Masayoshi Watanuki, Kanagawa, all of Japan

[73] Assignee: Ricoh Company, Ltd., Tokyo, Japan

[21] Appl. No.: 08/948,084

[22] Filed: Oct. 9, 1997

[30] Foreign Application Priority Data

Oct. 14, 1996 [JP] Japan .................................. 8-270974
Apr. 10, 1997 [JP] Japan .................................. 9-092557

[51] Int. Cl.⁶ .............................. G06K 9/32; H04N 1/04
[52] U.S. Cl. ...................... 382/295; 358/488; 358/471; 399/372
[58] Field of Search .................................. 358/400, 401, 358/406, 448, 474, 471, 479, 482, 488, 494, 496, 497, 498; 382/312, 313, 317, 319, 295; 399/394, 372

[56] References Cited

U.S. PATENT DOCUMENTS 5,327,261 7/1994 Hirota .................................. 358/449
5,604,601 2/1997 Edgar .................................. 358/474

FOREIGN PATENT DOCUMENTS 6-297758 10/1994 Japan .
9-252390 9/1997 Japan .............................. H04N 1/19
9-261695 10/1997 Japan .............................. H04N 17/04
10-51628 2/1998 Japan .............................. H04N 1/40

OTHER PUBLICATIONS

Shunsuke Hattori, et al. "A Development of Image Scanner of High Resolution", Japan Society of Mechanical Engineers, 71$^{st}$ Ordinary General Meeting, Lecture Meeting, Lecture Paper Collection (IV), Mar. 29–31, 1994, Tokyo, 3 pages.

*Primary Examiner*—Jerome Grant, II
*Attorney, Agent, or Firm*—Oblon, Spivak, McClelland, Maier & Neustadt, P.C.

[57] ABSTRACT

First and second patterns are located outside of an image reading area. A first pattern comprises a plurality of lines each extending at a fixed angle with respect to a sub-scan direction. A second pattern comprises a plurality of lines each extending at a fixed angle but having a reverse direction with respect to the sub-scan direction. An image reading portion reads the first and second patterns. A position error measuring portion measures first and second image reading position errors corresponding to different angle oblique lines of the first and second patterns of image data obtained as a result of reading the first and second patterns, respectively. The position error measuring portion compensates for position deviations of the first and second patterns using the first and second image reading position errors, and obtains position-deviation-compensated image reading position errors. A position error correcting portion corrects image data read by the reading means using the position-deviation-compensated image reading position errors.

7 Claims, 28 Drawing Sheets

|  | X1 | X2 | X3 | X4 | X5 | X6 | X7 | X8 | X9 |
|---|---|---|---|---|---|---|---|---|---|
| Y1 | 2 | 3 | 1 | 4 | 2 | 18 | 220 | 250 | 248 |
| Y2 | 2 | 1 | 2 | 3 | 13 | 216 | 248 | 250 | 252 |
| Y3 | 3 | 2 | 4 | 8 | 201 | 250 | 252 | 252 | 251 |
| Y4 | 2 | 3 | 4 | 183 | 251 | 254 | 252 | 249 | 32 |
| Y5 | 3 | 5 | 157 | 250 | 251 | 252 | 251 | 50 | 4 |
| Y6 | 2 | 130 | 249 | 250 | 251 | 250 | 62 | 5 | 3 |

FIG.8A

|    | X2 | X3 | X4 |
|----|----|----|----|
| Y1 | 3  | 1  | 4  |
| Y2 | 1  | 2  | 3  |
| Y3 | 2  | 4  | 8  |

FIG.8B

|    | X3 | X4 | X5 |
|----|----|----|-----|
| Y1 | 1  | 4  | 2   |
| Y2 | 2  | 3  | 13  |
| Y3 | 4  | 8  | 201 |

FIG.8C

|    | X4 | X5  | X6  |
|----|----|-----|-----|
| Y1 | 4  | 2   | 18  |
| Y2 | 3  | 13  | 216 |
| Y3 | 8  | 201 | 250 |

FIG.8D

|    | X5  | X6  | X7  |
|----|-----|-----|-----|
| Y1 | 2   | 18  | 220 |
| Y2 | 13  | 216 | 248 |
| Y3 | 201 | 250 | 252 |

FIG.8E

|    | X6  | X7  | X8  |
|----|-----|-----|-----|
| Y1 | 18  | 220 | 250 |
| Y2 | 216 | 248 | 250 |
| Y3 | 250 | 252 | 252 |

FIG.9A

|    | X2 | X3 | X4 |
|----|----|----|----|
| Y1 | 0  | 0  | 0  |
| Y2 | 0  | 0  | 0  |
| Y3 | 0  | 0  | 0  |

FIG.9B

|    | X3 | X4 | X5 |
|----|----|----|----|
| Y1 | 0  | 0  | 0  |
| Y2 | 0  | 0  | 0  |
| Y3 | 0  | 0  | 1  |

FIG.9C

|    | X4 | X5 | X6 |
|----|----|----|----|
| Y1 | 0  | 0  | 0  |
| Y2 | 0  | 0  | 1  |
| Y3 | 0  | 1  | 1  |

FIG.9D

|    | X5 | X6 | X7 |
|----|----|----|----|
| Y1 | 0  | 0  | 1  |
| Y2 | 0  | 1  | 1  |
| Y3 | 1  | 1  | 1  |

FIG.9E

|    | X6 | X7 | X8 |
|----|----|----|----|
| Y1 | 0  | 1  | 1  |
| Y2 | 1  | 1  | 1  |
| Y3 | 1  | 1  | 1  |

|  | X0 | X1 | X2 | X3 | X4 | X5 | X6 | X7 | X8 | X9 |
|---|---|---|---|---|---|---|---|---|---|---|
| Y0 | 4 | 4 | 10 | 40 | 150 | 241 | 202 | 120 | 22 | 6 |
| Y1 | 4 | 6 | 42 | 148 | 240 | 200 | 122 | 20 | 10 | 4 |
| Y2 | 10 | 40 | 150 | 239 | 200 | 121 | 21 | 10 | 5 | 4 |

18  50  202  427  590  562  345  150  37  14

(BEFORE CORRECTION)

(AFTER CORRECTION)

IMAGE READING APPARATUS

BACKGROUND OF THE INVENTION

1. Field of the Invention

The present invention relates to an image reading apparatus which measures an image reading position error from bit-map formation image data obtained from reading an image.

2. Description of the Related Art

As a first example of the related art, Shunsuke Hattori et al. disclose A Development of Image Scanner of High Resolution in the Japan Society of Mechanical Engineers, 71st ordinary general meeting, lecture meeting, lecture paper collection (IV) [Mar. 29–31, 1994, Tokyo]. Therein, an interpolation operation is performed on image data which is obtained as a result of reading a test chart having even-pitch lines arranged therein in a sub-scan direction. That image data is image data which is discrete in those sub-scan direction line intervals. From the interpolation operation result, the central positions of black lines and white lines of the even-pitch lines are obtained. Then, differences between the central positions and the reference pitch of the test chart are read. Thereby, image data reading position errors due to apparatus vibration or the like is detected.

As a second example of the related art, Japanese Laid-Open Patent Application No. 6-297758 discloses A Scan-line Pitch Measuring Method. Therein, a pattern of a hard copy having even-pitch pattern data written therein is read. Thereby, unevenness in the pitch of scan lines which are used in a hard-copy apparatus is measured.

In the above-described first example of the related art, due to possible spatial differences between the edges of the even-pitch lines and sampling positions, a 'Moire' effect may occur wherein a difference occurs between data which has been obtained as a result of reading the same pattern. Due to the Moire effect, thus-obtained read data may not be data which indicates positions corresponding to the edges of the pattern. Thereby, accuracy in measuring image reading position errors may be degraded. Such an adverse effect is very noticeable when the even-pitch line pattern is so fine as to approximate the resolution of the reading apparatus. As a result, the measuring of image reading position errors may not be performed. Thus, using this method, it is not possible to measure, with a high accuracy, an image reading position error of a pattern which is so fine as to approximate or to exceed than the resolution of the reading apparatus.

Further, because an even-pitch line pattern is used, even if the Moire effect is ignored, in a case where the pitch of the pattern is fine for measuring an image reading position error of a high-frequency component, due to the limitation of the MTF (Modulation Transfer Ratio) of the image formation system, a difference in a signal indicating image tone is disadvantageously reduced. Thus the measuring accuracy is degraded.

It is considered that, in the case where the pitch of the pattern is finer, the measuring frequency band is widened to a higher frequency. Thereby, it is not possible to provide a high measuring accuracy. Therefore, in order to solve this problem, the sampled data is made to undergo an interpolation operation. In order to improve the effect of the interpolation operation, it is necessary to increase an amount of surrounding data to be processed and to perform a complicated calculation. As a result, a longer time is required for the calculation. Further, the interpolation operation inherently may not provide true data, and thus the measuring accuracy may be degraded. Further, in the first example, image data to be used is obtained as a result of a specific light-reception element of the light-to-electricity converting device being used to scan the pattern in the sub-scan direction. The light-reception element itself may provide noise which may degrade the measuring accuracy.

In the above-described method of measuring in the second example of the related art, the light-to-electricity converting device is used to read the pattern and thus-obtained data is used. In this method, at this time, reading or scanning unevenness when reading or scanning a hard copy is not considered in measuring pitch unevenness in the pattern of the hard copy. Further, this method also has a 'Moire' effect problem similar to that which occurs in the above-described first example of the related art.

In order to solve these problems, the applicant of the present application filed Japanese Patent Application No. 7-260438. In this application, a pattern which is formed of a plurality of lines which have a fixed inclination with respect to a scanning direction is set on an image reading apparatus. A position deviation of the pattern may occur when the pattern is set on the image reading apparatus. A technique of detecting such a position deviation of the pattern was proposed in the above-mentioned application. In this technique, in order to correct such position deviation which occurs when the oblique-line pattern is set, an inclination of the oblique-line pattern is measured by linear approximation from measured image reading position error data.

However, when the average of a scanner's scanning speed is not a predetermined value, image reading position error data also has an inclination. Accordingly, it is necessary to separate the inclination of image reading position error data due to a position deviation of the oblique-line pattern and an inclination of the image reading position error data due to deviation of the average of a scanner's scanning speed from one another.

SUMMARY OF THE INVENTION

The present invention has been devised in consideration of the above-described background. An object of the present invention is to provide an image reading apparatus which separates the inclination of image reading position error data due to a position deviation of the oblique-line pattern and an inclination of the image reading position error data due to deviation of the average of a scanner's scanning speed from one another. Thereby, based on the thus-obtained inclination of the image reading position error data due to the deviation of the average of the scanner's scanning speed, the image reading apparatus corrects the image reading position error due to the deviation of the average of the scanner's scanning speed, and thus, provides image data without any image reading position error.

In order to achieve the above-described object, a first image reading apparatus which reads an original image by scanning the original image, main scan line by main scan line, with a fixed time interval, comprises:

first and second patterns which are located outside of an image reading area, a first pattern comprising a plurality of lines each extending at a fixed angle with respect to a sub-scan direction, a second pattern comprising a plurality of lines each extending at a fixed angle but having a reverse direction with respect to the sub-scan direction;

reading means for reading the first and second patterns;

measuring means for measuring first and second image reading position errors corresponding to different angle oblique lines of the first and second patterns of image data obtained as a result of reading the first and second patterns, respectively;

compensating means for compensating for position deviations of the first and second patterns using the first and second image reading position errors, and obtaining position-deviation-compensated image reading position errors; and correction means for correcting image data read by the reading means using the position-deviation-compensated image reading position errors.

A second image reading apparatus according to the first image reading apparatus, further comprises:

means for obtaining the first image reading position errors from the first pattern;

means for obtaining the second image reading position errors from the second pattern;

means for obtaining a difference between the first and second image reading position errors; and means for storing the difference between the first and second image reading position errors;

wherein, in ordinary image reading, one of the first and second patterns is used for measuring the image reading position errors, and, based on the difference between the first and second image reading position errors which was stored in the storing means, position deviation of the first and second patterns is compensated for.

A third image reading apparatus according to the first image reading apparatus, further comprises:

means for obtaining the first image reading position errors from the first pattern;

means for obtaining the second image reading position errors from the second pattern;

means for setting a window at a position so that the window includes a first pattern portion on a bit-map of image data obtained from reading the first pattern, when image reading position error measurement is started from the first pattern;

means for moving the window by an integer number of pixels in sequence along the first pattern portion so as to newly set the window;

means for newly setting the window at a position so that the window includes a second pattern portion on the bit-map of image data obtained from reading the second pattern, as a result of moving the window in a main scan direction when the window has reached a predetermined position;

means for calculating the position of the pattern portion in the window each time when the window is newly set; and means for obtaining the first and second image reading position errors by calculating a change of the position of the pattern portion in the window through each movement of the window.

A fourth image reading apparatus according to the first image reading apparatus, further comprises;

means for obtaining the first image reading position errors from the first pattern;

means for obtaining the second image reading position errors from the second pattern;

means for comparing the first and second image reading position errors with one another and obtaining a difference between the first and second image reading position errors; and means for determining that a noise is present when the difference between the first and second image reading position errors is significantly large locally, and removing the noise.

In the first image reading apparatus, without needing a strict pattern positioning mechanism or a pattern accuracy, the image reading position errors in the sub-scan direction can be measured with high accuracy. Further, because the image data is corrected using the measured image reading position errors, the image data which does not include image reading position errors can be obtained.

In the second image reading apparatus, in ordinary image reading, one of the first and second patterns is used for measuring the image reading position errors, and, based on the difference between the first and second image reading position errors which was stored in the storing means, position deviation of the first and second patterns is compensated for. As a result, the operation time can be reduced.

In the third image reading apparatus, the first and second patterns are alternately used for measuring the image reading position errors. Accordingly, the operation circuit can be simplified.

In the fourth image reading apparatus, a noise in the image data due to dust or flaw can be removed. Thereby, the image reading position errors can be measured with higher accuracy.

Other objects and further features of the present invention will become more apparent from the following detailed description when read in conjunction with the accompanying drawings.

BRIEF DESCRIPTION OF THE DRAWINGS

FIGS. 8A, 8B, 8C, 8D and 8E show read values defined by an oblique-line determining window;

FIGS. 9A, 9B, 9C, 9D and 9E show modified read values defined by the oblique-line determining window;

DETAILED DESCRIPTION OF THE PREFERRED EMBODIMENT

With reference to figures, an embodiment of the present invention will now be described.

1. General Arrangement of Image Reading Apparatus

Figure 1:
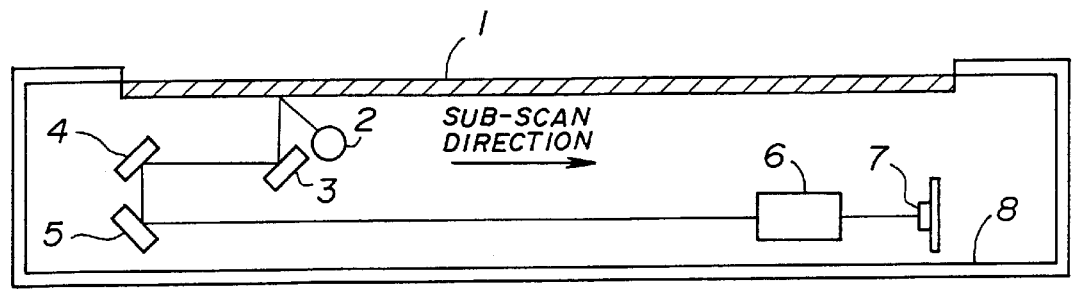
FIG. 1 shows a side elevational sectional view of an image reading apparatus in an embodiment of the present invention.

With reference to FIG. 1, an outline of an image reading apparatus in the embodiment of the present invention will now be described. A contact glass 1 is supported by a housing 8. An original image sheet is placed on the contact glass 1 where the to-be-read surface of the original image sheet faces downward. The to-be-read-surface of the original image sheet placed on the contact glass 1 is lit by a light source 2. The light reflected by the to-be-read surface is then reflected by a first mirror 3, a second mirror 4, and a third mirror 5, in sequence. Then, the thus-reflected light forms an image on light-reception surfaces of line-shaped light-to-electricity converting elements on a light-to-electricity converting device 7, by a lens 6. Then, the formed image is converted into an electric signal.

The light source 2 and the first mirror 3 are mounted on a first carriage (not shown in the figure). The first carriage is moved in a sub-scan direction (left-to-right direction in the figure) by a driving device (not shown in the figure), where the distance from the to-be-read surface of the original image sheet is fixed, so that the original image is read scan line by scan line. The second mirror 4 and third mirror 5 are mounted on a second carriage (not shown in the figure). The second carriage moves in the sub-scan direction in a speed which is half of the speed of the first carriage. Thereby, a predetermined area on the contact glass 1 can be read line by line.

Figure 2:
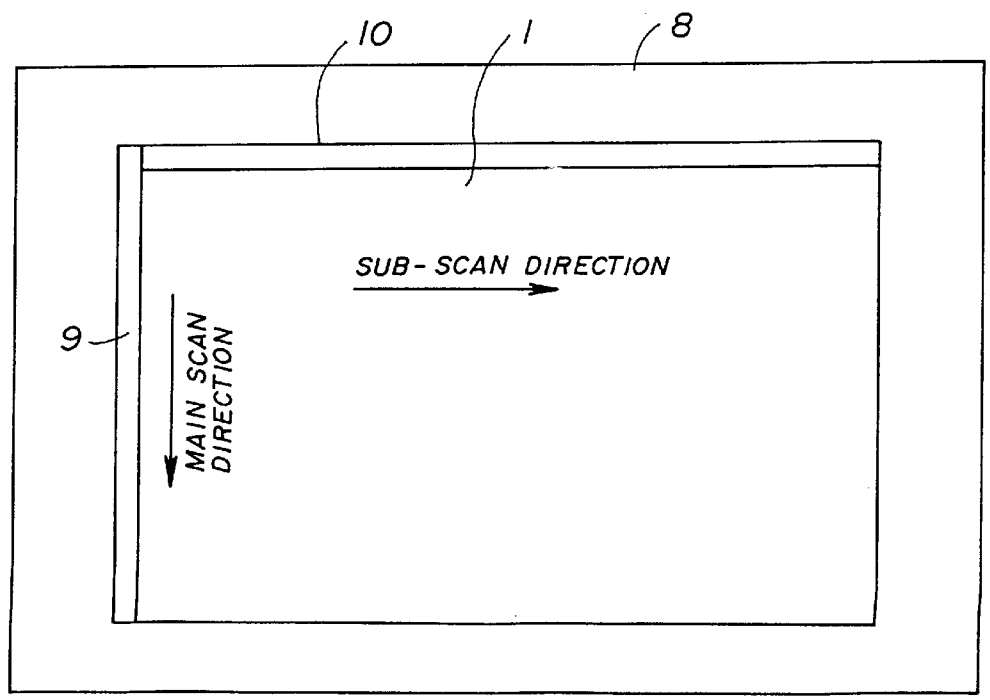
FIG. 2 shows a bottom view of a top portion of the image reading apparatus shown in FIG. 1.
Figure 3:
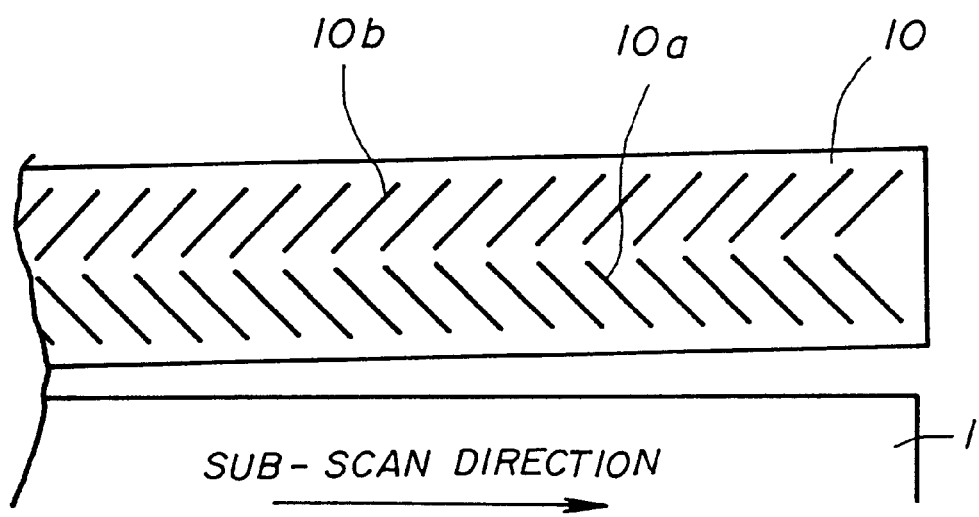
FIG. 3 shows a magnified view of a measuring chart and a contact glass shown in FIG. 2.

As shown in FIG. 2, on an inside surface of the housing 8 along an edge of the contact glass 1, a reference tone sheet 9 is provided to extend in the main scan direction. The reference tone sheet is used for causing the light-to-electricity elements to read the reference tone which is used for shading correction. In order to detect the scanning speed of the first carriage in the sub-scan direction, as shown in FIG. 3, a measuring chart 10 is provided on the inside surface of the housing 3 along another edge of the contact glass 1. On the measuring chart 10, an oblique-line pattern 10a which is formed of a row of many black oblique lines with equal pitch, each of which extends at 45° and another oblique-line pattern 10b which is formed of a row of many black oblique lines with equal pitch, each of which extends at 135° are formed in a white background. As shown in the figure, the two oblique-line patterns 10a and 10b are arranged so as to be adjacent to one another. The reference tone sheet is read by the light-to-electricity converting device 7, and the electric signal obtained from the light-to-electricity converting device 7 is used for compensating sensitivity variation among the respective light-to-electricity converting elements, lighting unevenness, reduction of peripheral light intensity of the lens 6 and so forth. Similarly, the two oblique-line patterns 10a and 10b are read by the light-to-electricity converting device 7 together with the original image of an original image sheet. Accordingly, it is necessary that the image of the oblique-line patterns 10a and 10b as well as the original image be formed on the light-reception surfaces of the light-to-electricity converting elements. For this purpose, the oblique-line patterns are provided at the same height as the height of the surface of the contact glass 1 on which the original image sheet is placed. Although the oblique-line patterns 10a and 10b are provided adjacent to the contact glass 1 on the bottom surface of the top plate of the image reading apparatus in the example shown in FIGS. 2 and 3, it is also possible that the oblique-line patterns 10a and 10b are provided on the top surface of the contact glass 1. When image reading position errors are measured using images read in a computer or the like, the oblique-line patterns 10a and 10b may be provided in the original image reading area.

FIG. 3 is a magnified view of part of the two oblique-line patterns 10a and 10b and the contact glass 1 shown in FIG. 2. The oblique-line patterns 10a and 10b are formed of a plurality of lines having fixed inclinations which are opposite to one another. It is preferable that the measuring chart 10 is provided in parallel to the sub-scan direction. However, there is a case where the position of the measuring chart 10 is deviated from a predetermined position due to the material of the measuring chart 10, or erroneous assembling of the measuring chart 10. FIG. 3 shows such a case where the position of the measuring chart 10 is deviated from the predetermined position.

2. System Arrangement

Figure 4:
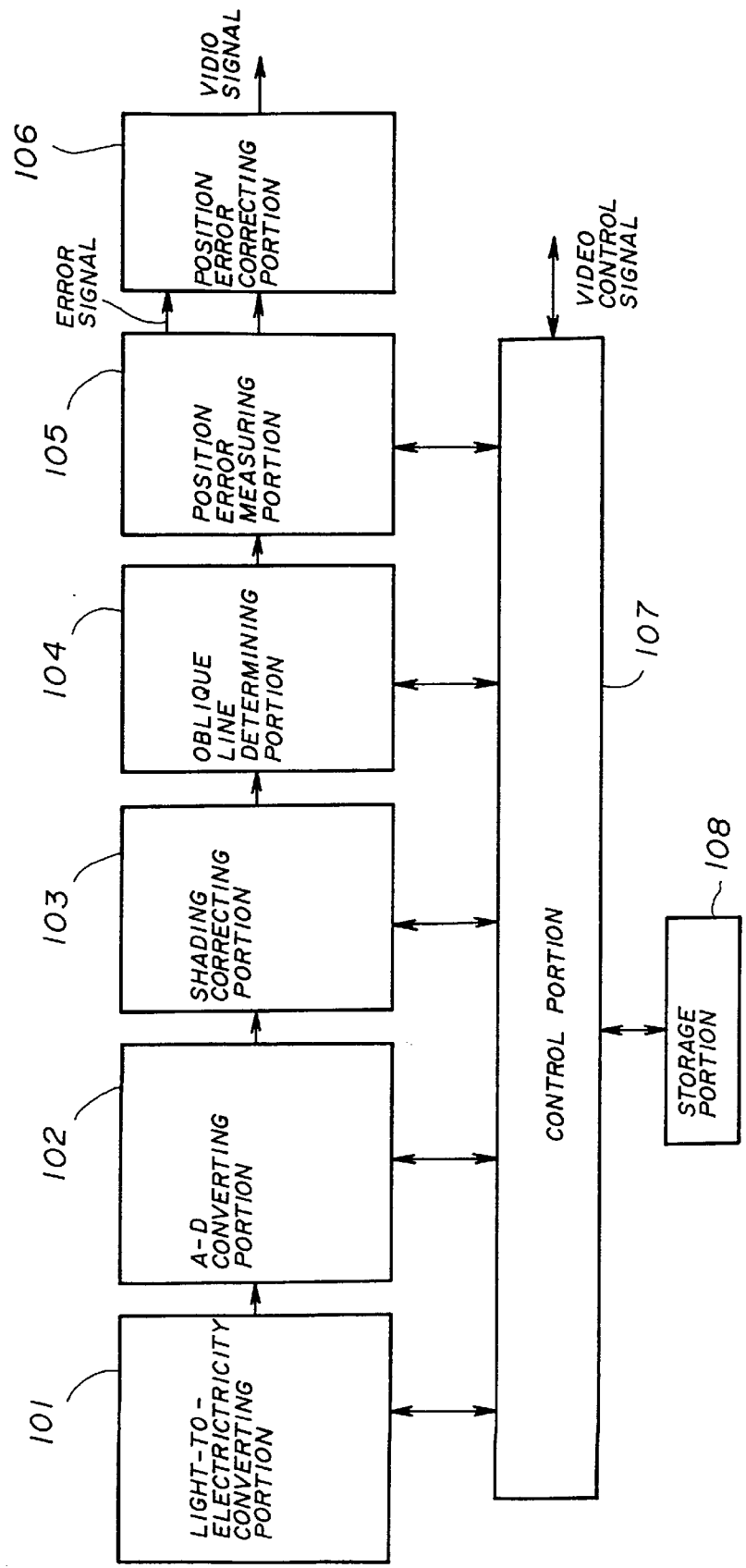
FIG. 4 shows a block diagram of a system arrangement of a position error measuring device which is included in the image reading apparatus shown in FIG. 1.

FIG. 4 shows a system arrangement of a position error measuring device which is included in the image reading apparatus in the embodiment of the present invention. This position error measuring device is included in the image reading device as a device providing additional functions, and measures image reading position errors in real time.

The position error measuring device includes a light-to-electricity converting portion 101, an A-D converting portion 102, a shading correcting portion 103, an oblique-line determining portion 104, a position error measuring portion 105, a position error correcting portion 106, a control portion 107 and a storage portion 108. The light-to-electricity converting portion 101 is formed of a line CCD in this embodiment, and converts a read image into an electric signal. The electric signal is converted into digital multi-level image data by the A-D converting portion 102. The thus-obtained data is corrected by the shading correcting portion 103 so that sensitivity variation among pixels of the light-to-electricity converting portion 101, lighting unevenness, reduction of peripheral light intensity of the lens 6 and so forth are compensated for. The thus-obtained data is input into the oblique line determining portion 104. The oblique line determining portion 104 determines whether or not a portion of the measuring chart 10 is present in the given image data. The oblique line determining portion 104 provides the result of the determination to the control portion 107. Further, the image data is input to the position error measuring portion 105. The position error measuring portion 105 measures the image reading position error between lines for each read line (main scan line), and outputs the measurement result as an error signal. The position error measuring portion 105 measures the image reading position errors for the two oblique-line patterns 10a and 10b, respectively, which have the fixed inclinations with respect to the sub-scan direction. From the thus-obtained two kinds of image reading position error data, the position error measuring portion 105 obtains the correct image reading position error data. The position error measuring portion 105 outputs the thus-obtained correct image reading position error data as the error signal. The position error correcting portion 106 generates image data obtained as a result of correcting the image reading position error from the given image data and error signal, and outputs the thus-obtained image data as a video signal. The control portion 107 sets operation timings and operation conditions of the respective portions (101 through 106) so that these respective portions operate with relationship to each other. The storage portion 108 stores a later-described position deviation amount of the oblique-line patterns 10a and 10b.

3. Measurement Principle

The image reading position error measurement principle in the position error measuring portion 105 will now be described.

First, image reading error measurement process will be described.

Figure 5:
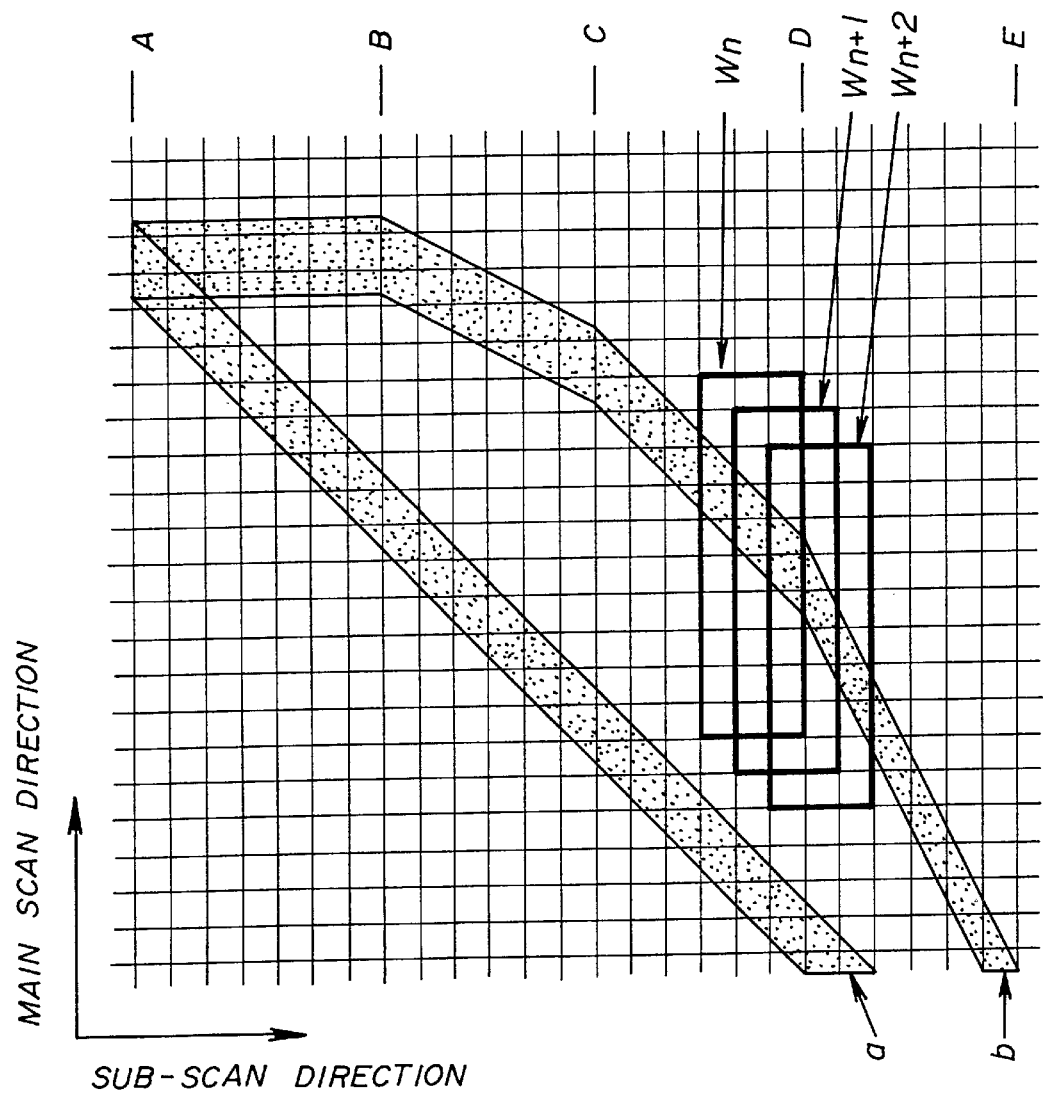
FIG. 5 illustrates read data of an oblique line in accordance with variation of scanning speed.

A main scan direction is indicated by an arrow in FIG. 5. An original image is read by the light-to-electricity converting device 7 (corresponding to the light-to-electricity converting portion 101 in FIG. 4), scan line by scan line, and thus each scan line of the image is read at the same time. Thus, pixels forming a scan line are read in parallel. Each scan line of pixels are arranged in the main scan direction. The thus-read scan line of pixels is output in series, in the main scan direction order. After each scan line of pixels is read, a reading area is moved to a subsequent scan line of the original image, in a sub-scan direction indicated by an arrow in FIG. 5, and the scan line of the image is read. Thus, a sequence of scan lines of the original image is read. That movement of the reading area is achieved as follows: The scanning optical system is moved and the original image sheet is not moved. Further, it is also possible that the movement of the reading area is achieved as follows: The original image is moved and the scanning optical system is not moved.

In this case, each square, shown in FIG. 5, which is defined by lines in the main scan direction and lines in the sub-scan direction, is treated as a respective pixel. An area consisting of those pixels is also treated as a mapped image of the original image which is obtained as a result of arranging image data carried by an electric signal which is obtained from the original image as a result of converting light to electricity. The above-mentioned area consisting of the pixels may be referred to as a bitmap. In a case where the line CCD (light-to-electricity converting device) 7 outputs the thus-read pixels in real time, the main scan direction and sub-scan direction indicate the pixel order on the time axis. However, after the pixel data is stored in a memory, any pixel can be accessed, and thus it is possible to treat those pixels without regard to the main scan direction and sub-scan direction order on the time axis.

FIG. 5 shows a case where each pixel is such that the size thereof in the main scan direction is equal to the size thereof in the sub-scan direction. A line 'a' shown in the figure corresponds to data which is obtained as a result of reading a 45° oblique line in a condition where a scanning speed in the subscan direction is fixed. A line 'b' shown in the figure correspond to data which is obtained as a result of reading the 45° oblique line in a condition where the scanning speed in the sub-scan direction changes. Each of the lines 'a' and 'b' is thus formed in the bit-map which is obtained as a result of arranging image data carried by the electrical signal which is obtained from the original 45° oblique line, as shown in the figure. As shown in the figure, in the case where the original 45° oblique line is read in the condition where the scanning speed in the subscan direction is fixed to be a predetermined speed corresponding to clock pulses for controlling sub-scan direction reading timing, the identical 45° oblique line 'a' is formed in the bit-map.

In contrast to this, in the case where the original 45° oblique line is read in the condition where the scanning speed in the sub-scan direction changes, the line 'b' formed in the bit-map has different inclinations according to the changing scanning speeds. In detail, with regard to the line 'b', a portion between A–B in the sub-scan direction is formed where the scanning speed in the sub-scan direction is 0. In that condition, although a bit-map address in the sub-scan direction advances according to the above-mentioned clock pulses for controlling the sub-scan direction reading timing, the reading area on the original image does not shift. Thereby, that portion of the line 'b' extends in the sub-scan direction as shown in the figure. A portion between B–C in the sub-scan direction is formed where the scanning speed in the sub-scan direction is ½ the predetermined speed. In this condition, as the bit-map address advances according to the clock pulses, the reading area on the original image shifts by ½ a predetermined distance. Thereby, the angle θ between this portion of the line 'b' and the sub-scan direction is approximately 26.57° because tan θ=0.5. A portion between C–D in the sub-scan direction is formed where the scanning speed in the sub-scan direction is fixed to be the predetermined speed. Thereby, the angle between this portion of the line 'b' and the sub-scan direction is 45°. A portion between D–E in the sub-scan direction is formed where the scanning speed in the sub-scan direction is twice the predetermined speed. In this condition, as the bit-map address advances according to the clock pulses, the reading area on the original image shifts by twice the predetermined distance. Thereby, the angle θ between this position of the line 'b' and the sub-scan direction is approximately 63.4°.

Thus, the inclination of the read line 'b' changes depending on the scanning speed in the subscan direction. In other words, the moving speed of a portion of the original 45° oblique line in the main scan direction, which portion is being currently read, depends on the scanning speed in the sub-scan direction. By detecting such a phenomenon, an image reading position error (pixel position error) in a bit-map image due to unevenness in the sub-scan direction scanning speed, unevenness in the original image carrying speed in a case of an automatic original image carrying system, and vibrations of the mirrors 3 through 5, the lens 6 and the light-to-electricity converting device 7, can be measured.

The above descriptions are based on the assumption that each pixel has a square shape and the 45° oblique line is used. However, it is not necessary to be limited to such an assumption. For example, it is not necessary that each pixel has a square shape. Further, it is not necessary that such a 45° oblique line is used. For example, it is possible to apply this measurement principle to image data having a main scan direction resolution of 400 dpi and a sub-scan direction resolution of 600 dpi. A moving speed of a portion of an oblique line in the main scan direction, which portion is being currently read, similarly depends on a scanning speed in the sub-scan direction even if the oblique line to be used is not an oblique line having a 45° angle from the sub-scan direction. Therefore, image reading position errors can be measured by using the same measurement principle.

4. Oblique Line Determination Operation

An oblique line determination operation performed by the oblique line determining portion 104 shown in FIG. 4 will now be described.

Figures 6, 7:
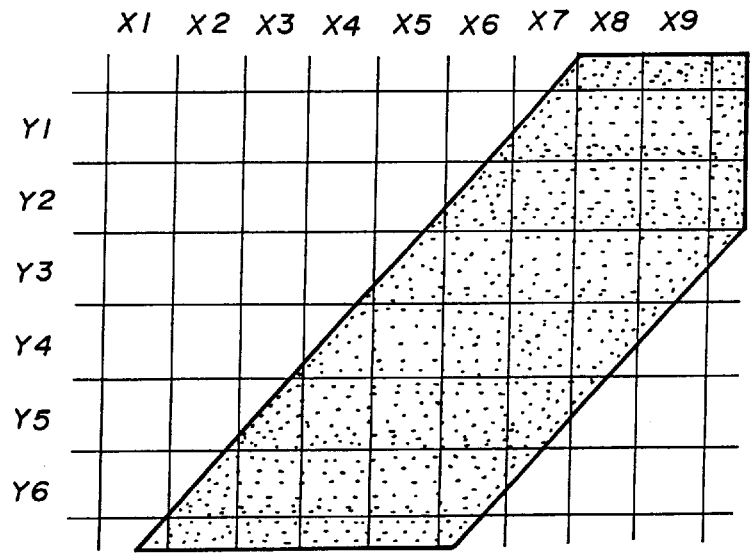
FIG. 6 shows a magnified view of read data of a oblique line.
FIG. 7 illustrates read values of the read data of the oblique line shown in FIG. 6.
Figure 10A:
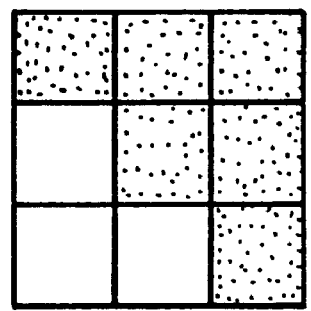
FIGS. 10A, 10B, 10C and 10D illustrate oblique-line determining matching patterns.
Figure 10B:
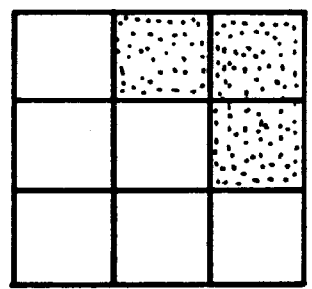
Figure 10C:
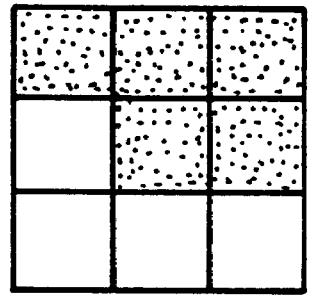
Figure 10D:
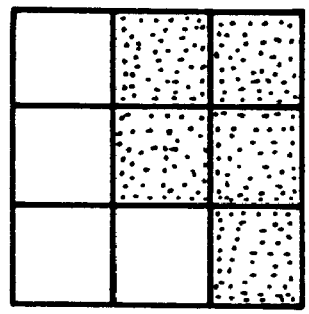

FIG. 6 shows a bit-map formation of image data representing a middle portion of an oblique line of a measuring chart, similar to the oblique line 'a', for example, shown in FIG. 5, which image data is obtained from reading the oblique line. FIG. 7 shows specific image data values of respective pixels of the image data shown in FIG. 6. Each of the image data values is expressed by 8-bit digital data (0 to 255) where white is expressed by '0' and black is expressed by '255'. In the bit-map formation shown in FIGS. 6 and 7, main scan direction coordinate values are represented by Xn and sub-scan direction coordinate values are represented by Yn. In the oblique line determination operation, an oblique-line determining window is used. This oblique-line determining window is of 3 pixels (main scan direction) by 3 pixels (subscan direction). Each of FIGS. 8A through 8E shows a pixel group, defined by the oblique-line determining window, of the image data show in FIG. 7. The pixel groups shown in FIGS. 8A through 8E are obtained by shifting the oblique-line determining window pixel by pixel in the main scan direction on the bit-map formation of image data shown in FIG. 7.

In this operation, first, for the pixel group (X2–X4, Y1–Y3) defined by the oblique-line determining window shown in FIG. 8A, a total of image data values of three pixels located at the top-left corner excluding the central pixel is calculated as Pa, and a total of image data values of three pixels located at the bottom-right corner excluding the central pixel is calculated as Qa. Thus, $$Pa=(X2, Y1)+(X3, Y1)+(X2, Y2)=3+1+1=5;$$

and $$Qa=(X4, Y2)+(X3, Y3)+(X4, Y3)=3+4+8=15.$$

Similarly, for the other four pixel groups shown in FIGS. 8B, 8C, 8D and 8E, totals of pixel values of corner pixels are obtained, respectively, as follows:

$$Pb=(X3, Y1)+(X4, Y1)+(X3, Y2)=1+4+2=7; \text{ and}$$

$$Qb=(X5, Y2)+(X4, Y3)+(X5, Y3)=13+8+201=222.$$

$$Pc=(X4, Y1)+(X5, Y1)+(X4, Y2)=4+2+3=9; \text{ and}$$

$$Qc=(X6, Y2)+(X5, Y3)+(X6, Y3)=216+201+250=667.$$

$$Pd=(X5, Y1)+(X6, Y1)+(X5, Y2)=2+18+13=33; \text{ and}$$

$$Qd=(X7, Y2)+(X6, Y3)+(X7, Y3)=248+250+252=750.$$

$$Pe=(X6, Y1)+(X7, Y1)+(X6, Y2)=18+220+216=454; \text{ and}$$

$$Qe=(X8, Y2)+(X7, Y3)+(X8, Y3)=250+252+252=754.$$

Then, a difference R (Ra, Rb, Rc, Rd, Re) between the total for the bottom-right corner pixels and the total for the top-left corner pixels is calculated for each pixel group, as follows:

$$Ra=Qa-Pa=15-5=10;$$

$$Rb=Qb-Pb=222-7=215;$$

$$Rc=Qc-Pc=667-9=658;$$

$$Rd=Qd-Pd=750-33=717; \text{ and}$$

$$Re=Qe-Pe=754-454=300.$$

When such a difference R (Ra, Rb, Rc, Rd, Re) has a larger value, it is determined that the oblique-line determining window comes to or starts to include pixels of an oblique line. Thereby, it is determined that the oblique-line determining window includes pixels of such an oblique line. For example, if a value '500' is determined as a threshold value, it is determined that the oblique-line determining window includes pixels of an oblique line when the difference R is more than 500. According to this determination threshold value, in the case of each of the pixel groups shown in FIGS. 8C and 8D, it is determined that the oblique-line determining window includes pixels of an oblique line.

With reference to FIGS. 9A through 9E, another example of the method of the oblique line determination operation will now be described. The pixel values shown in FIGS. 9A through 9E are obtained as a result of converting the pixel values shown in FIGS. 8A through 8E into bilevel values ('0' or '1') with a conversion threshold value of '128'. Using the pixel values shown in FIGS. 9A through 9E, the above-mentioned calculation of a total of the top-left corner pixels (Pa, Pb, Pc, Pd, Pe) and a total of the bottom-right corner pixels (Qa, Qb, Qc, Qd, Qe) is performed for each pixel group, as follows:

$Pa=(X2, Y1)+(X3, Y1)+(X2, Y2)=0+0+0=0$; and $Qa=(X4, Y2)+(X3, Y3)+(X4, Y3)=0+0+0=0$.

$Pb=(X3, Y1)+(X4, Y1)+(X3, Y2)=0+0+0=0$; and $Qb=(X5, Y2)+(X4, Y3)+(X5, Y3)=0+0+1=1$.

$Pc=(X4, Y1)+(X5, Y1)+(X4, Y2)=0+0+0=0$; and $Qc=(X6, Y2)+(X5, Y3)+(X6, Y3)=1+1+1=3$.

$Pd=(X5, Y1)+(X6, Y1)+(X5, Y2)=0+0+0=0$; and $Qd=(X7, Y2)+(X6, Y3)+(X7, Y3)=1+1+1=3$.

$Pe=(X6, Y1)+(X7, Y1)+(X6, Y2)=0+1+1=2$; and $Qe=(X8, Y2)+(X7, Y3)+(X8, Y3)=1+1+1=3$.

Then, similarly, a difference R (Ra, Rb, Rc, Rd, Re) between the total for the bottom-right corner pixels and the total for the top-left corner pixels is calculated for each pixel group, as follows:

$Ra=Qa-Pa=0-0=0$;

$Rb=Qb-Pb=1-0=1$;

$Rc=Qc-Pc=3-0=3$;

$Rd=Qd-Pd=3-0=3$; and $Re=Qe-Pe=3-2=1$.

Similarly, when such a difference R (Ra, Rb, Rc, Rd, Re) has a larger value, it is determined that the oblique-line determining window includes pixels of an oblique line of the oblique-line pattern 10a or 10b. In this case, for example, if a value '2' is determined as a threshold value, it is determined that the oblique-line determining window includes pixels of an oblique line of the oblique-line pattern 10a or 10b when the difference R is more than 2. According to this determination threshold value, in the case of each of the pixel groups shown in FIGS. 9C and 9D, it is determined that the oblique-line determining window includes pixels of an oblique line of the oblique-line pattern 10a or 10b. In this method, because each pixel value is converted into a bilevel value as mentioned above, the calculations can thus be simplified.

With reference to FIGS. 10A through 10D, another example of the method of the oblique line determination operation will now be described. In this method, pattern matching is used. In each of FIGS. 10A through 10D, each blank square represents a '0' pixel while each dotted square represents a '1' pixel. In this method, first, image data of a pixel group defined by the oblique-line determining window is converted into bilevel image data values, as shown in FIGS. 9A through 9E. Then, the thus-obtained image data of each pixel group is compared with each matching pattern of those shown in FIGS. 10A through 10D. Then, when the image data of a pixel group defined by the oblique-line determining window is coincident with any of those matching patterns, it is determined that the oblique-line determining window includes pixels of an oblique line of the oblique-line pattern 10a or 10b. In this example, the image data of the pixel groups shown in FIGS. 9C and 9D are coincident with the matching patterns shown in FIGS. 10B and 10A, respectively. Thereby, in the case of each of the pixel groups shown in FIGS. 9C and 9D, it is determined that the oblique-line determining window includes pixels of an oblique line of the oblique-line pattern 10a or 10b.

In this embodiment, the oblique-line determining window has the size of 3 pixels by 3 pixels. However, it is possible to use another size of the oblique-line determining window. Also in the case of using another size of the oblique-line determining window, similar methods can be applied for performing the oblique line determination operation. Generally speaking, as the size of the oblique-line determining window is increased, the determination accuracy becomes higher. However, the time required for the determination operation increases, and a circuit scale required for the determination operation increases.

Further, in the above descriptions, only the cases where the oblique-line determining window includes pixels of the left side of an oblique line are included. However, those methods can also be applied to cases where the oblique-line determining window includes pixels of the right side of an oblique line. In those cases, top-left pixels have larger tone values and bottom-right pixels have smaller tone values, although the top-left pixels have smaller tone values and the bottom-right pixels have larger tone values in the above-described case of FIGS. 8A through 8E. Similarly, for the cases of the oblique-line determining window including pixels of the right side of an oblique line, matching patterns, which are obtained by inverting the dotted pixels and blank pixels of the matching patterns shown in FIGS. 10A through 10D, may be used. Further, it is also possible to move the oblique-line determining window in the reverse direction of the main scan direction, that is, to move the oblique-line determining window leftwardly in FIG. 7, and thus to reach the condition that the oblique-line determining window includes pixels of the right side of an oblique line and then the condition that the oblique-line determining window includes pixels of the left side of an oblique line.

5. Position Error Measurement Operation

Figure 11:
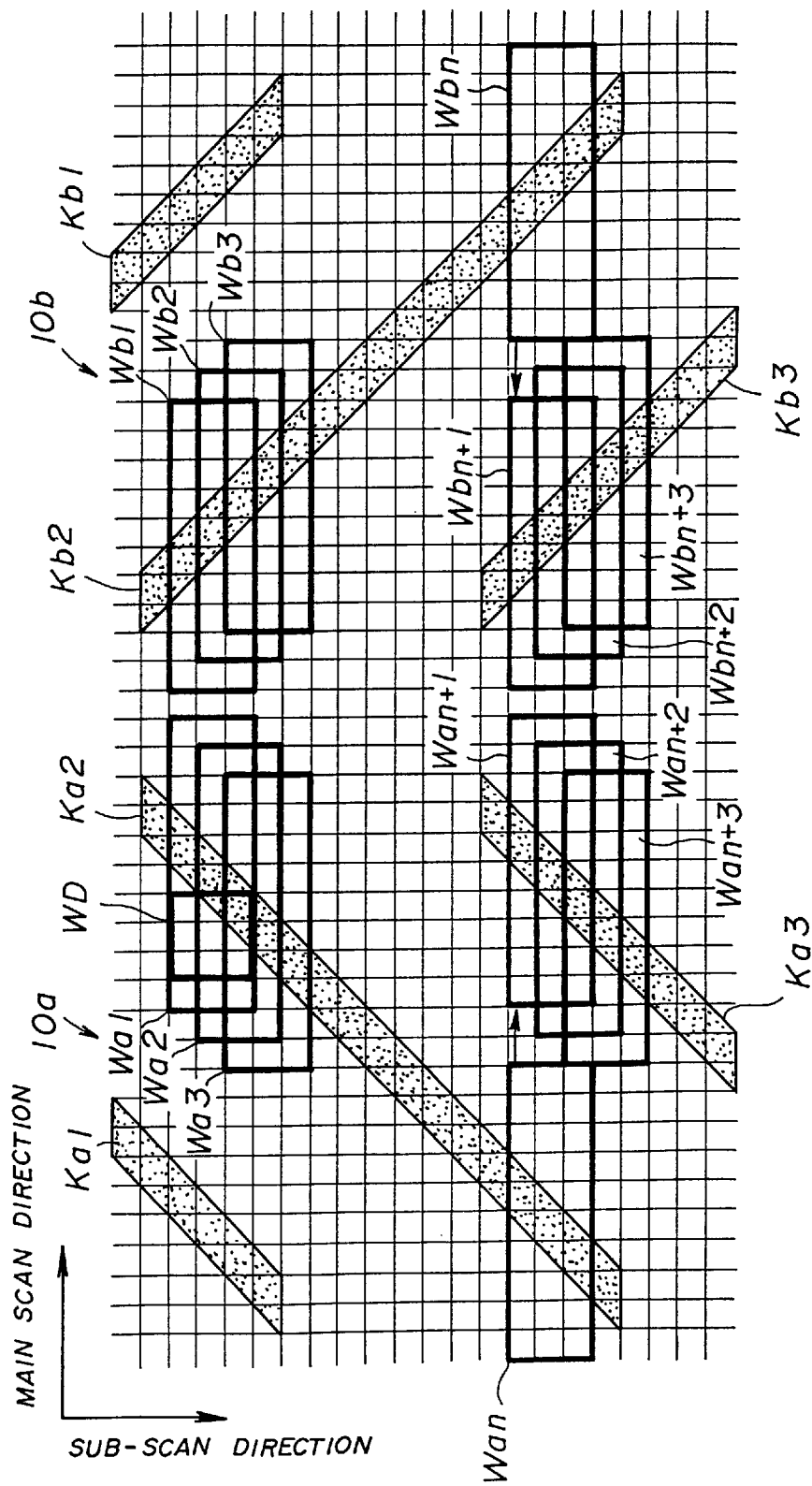
FIG. 11 illustrates windows for measuring the centers of gravity.

A position error measurement operation in the position error measuring portion 105 will now be described. FIG. 11 shows a plurality of oblique lines of the oblique-line patterns 10a and 10b in the bit-map shown in FIG. 5 (in FIG. 11, six oblique lines Ka1 through Ka3 and Kb1 through Kb3) and shows windows W, the size of each being 10 pixels by 3 pixels, for measuring image reading position errors.

A case where image reading position errors are obtained from the oblique line Ka2 of the left oblique line pattern 10a will now be described. First, the center of gravity of the data in the window W in the main scan direction is calculated for obtaining the position of the oblique line in the window W. The window is shifted as Wa1→Wa2→Wa3 in the oblique bottom-left 45° direction in sequence. At this time, control is performed so that the window always includes the oblique line Ka2. Then, when the window has reached a predetermined main-scan-direction address, in this case, when the window has reached the position Wan, the window is moved in the main scan direction to reach the position Wan+1 of the subsequent oblique line Ka3. The window is moved similarly as Wan+1→Wan+2→Wan+3. The center of gravity of the window W is calculated for each position of the window W.

Similarly, for the right oblique line Kb2, the window W is shifted as Wb1→Wb2→Wb3 in the oblique bottom-right 45° direction in sequence. Then, when the window has reached a predetermined main-scan-direction address, in this case, when the window has reached the position Wbn, the window is moved in the direction reverse to the main scan direction to reach the position Wbn+1 of the subsequent oblique line Kb3. The window W is moved similarly as Wbn+1→Wbn+2→Wbn+3. The center of gravity of the window W is calculated for each position of the window W. In this case, when the window is moved to a subsequent oblique line, that is, when the window is moved as Wan→Wan+1 and Wbn→Wbn+1, moving the windows at the same main-scan line for the two oblique-line patterns 10a and 10b simplifies the control. Further, when image reading position errors are measured in real time, by moving the window as Wa1→Wb1→Wa2→Wb2→Wa3→Wb3, the center of gravity of the window for the two oblique-line patterns 10a and 10b can be measured in a line clock pulse of the sub-scan direction. Thereby, measurement with the minimum line memory can be possible.

As shown in FIG. 11, the window W moves in the direction which is 45° from the main scan direction and also 4520 from the sub-scan direction in the condition where each pixel has a square shape, because the window moves one pixel by one pixel in the main scan direction, and simultaneously, one pixel by one pixel in the sub-scan direction. Therefore, the position of the center of gravity of the image data in the window in the main scan direction shifts one pixel by one pixel in the main scan direction or the direction reverse to the main scan direction as the window moves as mentioned above unless the positions of pixels of the oblique line shifts due to undesirable causes. If the center of gravity of the pixels in the window does not shift one pixel by one pixel in the main scan direction or the reverse direction to the main scan direction as the center-of-gravity measuring window moves one pixel by one pixel in each of the main scan direction or the reverse direction to the main scan direction and sub-scan direction simultaneously, there would be an undesirable reason for the failure of the center of gravity to properly shift. Such a difference is an image reading position error which should be measured in the position error measuring process according to the present invention. In other words, by determining whether or not the center of gravity of the data in the window shifts one pixel by one pixel in the main scan direction or the direction reverse to the main scan direction as the window moves one pixel by one pixel in each of the main scan direction or the direction reverse to the main scan direction and the sub-scan direction simultaneously, it can be determined whether the oblique line formed in the bit-map from the read image data is such as the oblique line 'a' shown in FIG. 5 or is such as the oblique line image 'b' shown in the figure. In the case where the oblique line 'a' is formed from the read image data, the center of gravity of the data in the window shifts one pixel by one pixel in the main scan direction or the direction reverse to the main scan direction as the center-of-gravity measuring window moves one pixel by one pixel in each of the main scan direction or the direction reverse to the main scan direction and the sub-scan direction simultaneously. Then, it can be determined that there is no image reading position error. Otherwise, it can be determined that there is some image reading position error. The degree of image reading position error is determined by how far apart the calculated center of gravity is from a reference position of the center of gravity in the case where the center of gravity of the data in the window does not shift one pixel by one pixel in the main scan direction or the direction reverse to the main scan direction as the window moves one pixel by one pixel in each of the main scan direction or the direction reverse to the main scan direction and the sub-scan direction simultaneously. The above-mentioned reference position of the center of gravity is moved one pixel in the main scan direction or the direction reverse to the main scan direction each time the window moves one pixel in the main scan direction or the direction reverse to the main scan direction and one pixel in the sub-scan direction simultaneously. In a case where it is determined that a main cause of the image reading position error is unevenness of the sub-scan direction scanning speed, it is easy to appropriately convert the data of the image reading position error into data of the direction scanning speed error. Thereby, it is possible to compensate for the sub-scan direction scanning speed error.

When the center of gravity of the data in the window is calculated, data of many pixels including pixels surrounding the oblique line is also used. That data may include various types of noise such as noise inherent in the CCD and so forth. The center of the portion of the oblique line is obtained by calculating the center of gravity of the data in the window according to the present invention as mentioned above. By this method, in the process of calculating the center of gravity of the image data in the center-of-gravity measuring window, the effect of such noise can be reduced, because the data of many pixels including pixels surrounding the oblique line is used, and the noise generally appears at random throughout the entire area of the window, and, thus, individual noises may be canceled out by each other. Thus, the center of the portion of the oblique line can be obtained in a high S/N (signal to noise) ratio condition. Ordinarily, when the number of pixels defined by the window is increased, the S/N ratio is higher. It is preferable that the window be larger in the main direction because the data in the window is used for calculating the center of gravity of the data in the window in the main scan direction. It is possible to perform the image reading position error measurement using a window having a length in the sub-scan direction of one pixel.

6. Center of Gravity Measurement Operation

Figure 12:
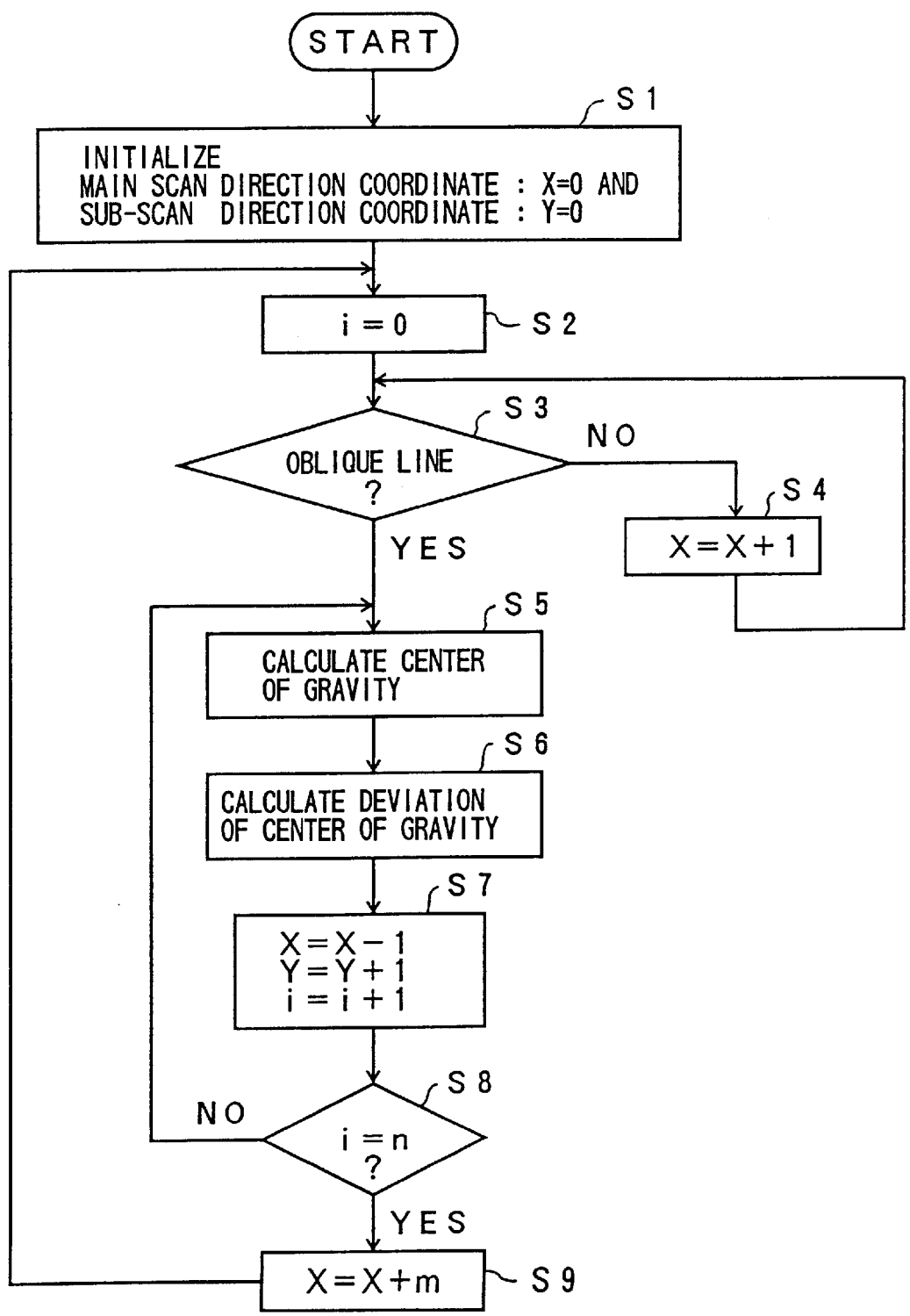
FIG. 12 shows a flowchart for illustrating a center-of-gravity measuring operation in the position error measuring device.

A center of gravity measurement operation will now be described. The processes shown in FIG. 12 start at the same time when scanning of an original image is started. Each of X and Y coordinate values is initialized so that X=0 and Y=0, in S1. The X, Y coordinate values represent a pixel position, which pixel is included in the above-mentioned oblique-line determining window which is thus set in a bit-map formation of obtained image data. For example, the X, Y coordinate values represent a position of the center pixel of the oblique-line determining window of 3 pixels by 3 pixels. Then, a variant 'i' which indicates the number of measuring operations which have been performed on one oblique line is initialized to be '0', in S2.

Then, in S3, the oblique line determining portion 104 shown in FIG. 4 determines (in the method described above in the item 4 with reference to FIGS. 6 through 10D) whether or not the set oblique-line determining window (of a size of 3 pixels by 3 pixels) includes pixels of an oblique line. If it is determined that the oblique-line determining window does not include pixels of an oblique line, the X coordinate value is incremented by one and, thereby, the oblique-line determining window is shifted by one pixel in the main scan direction in the bit-map formation of the image data, in S4. This amount of shifting of the oblique-line determining window does not need to be limited to one pixel. The amount of shifting of the oblique-line determining window may be determined depending on a size of the oblique-line determining window and a thickness of each oblique line. It is possible that the amount of shifting of the oblique-line determining window may correspond to a plurality of pixels instead of one pixel. If it is determined in S3 that the oblique-line determining window includes pixels of an oblique line, the window Wa1 for measuring the center of gravity (such as that shown in FIG. 11) is set in the bit-map formation of the image data, and the center of gravity of the data of pixels defined by the window Wa1 is calculated, in S5. A setting position of the window Wa1 is determined so as to have a predetermined spatial relationship with the position of the oblique-line determining window. For example, the spatial relationship between the center-of-gravity measuring window Wa1 and oblique-line determining window WD is such as that shown in FIG. 11. When the center of gravity is calculated, the position of the window Wa1 may be shifted in the main scan direction or the direction reverse to the main scan direction by an integer of pixels so that a portion of the oblique line within the Wa1 may be positioned at the center of the window Wa1.

After the center of gravity is calculated in S5, a deviation of the center of gravity is calculated in comparison to the case where the oblique line is read by the image reading apparatus without any reading error, in S6. Then, the X coordinate value is decremented by one pixel (−1), the Y coordinate value is incremented by one pixel (+1) and the variant 'i' which indicates the number of measuring operations which have been performed on that oblique line is incremented by 1, in S7. Thereby, the position of the window is shifted into the position Wa2 shown in FIG. 11 as a result of shifting in the sub-scan direction by one pixel and shifting in the direction reverse to the main scan direction by one pixel. The shifting amount does not need to be limited to one pixel in the sub-scan direction and the direction reverse to the main scan direction. In the above-described examples, the window is moved one pixel by one pixel. However, in a case where a frequency band of reasons for image reading position errors such as apparatus vibration is low, for example, it is possible that the window is moved two (or more) pixels by two (or more) pixels in each of the main scan direction and sub-scan direction simultaneously. Thereby, it is possible to shorten the time required for the image reading position error measuring operations.

Before the above-mentioned variant 'i' reaches a predetermined number 'n', the operation returns to S5 from S8. After the variant 'i' reaches the predetermined number 'n', that is, after the window is positioned at the position Wan shown in FIG. 11, the operation goes from S8 to S9, and thus the window is shifted into the position Wan+1 for the subsequent oblique line Ka3, in S9. For this purpose, the coordinates of the window are shifted in the main scan direction by a certain number of pixels, which number is smaller, by an integer m of pixels, than the number of pixels corresponding to the distance between the adjacent oblique line images. Then, the above-mentioned variant 'i' is initialized at '0', in S2. Then, the operation again starts from the oblique line determining operation in S3 for the oblique line Ka3. Thus, the window is shifted into positions Wan+1, Wan+2, Wan+3, . . . , respectively, and the image reading position error measurement (that is, the center-of-gravity error measurement) is performed for each window position.

By using a plurality of parallel oblique lines such as those shown in FIG. 11 in the image reading position error measurement according to the present invention, it is possible to perform the measurement throughout an original image reading area of the image reading apparatus even if the original image reading area is longer in the sub-scan direction and shorter in the main scan direction. Further, by using the plurality of parallel oblique lines in the measurement, it is possible to use in the measurement the measuring chart or patterns which are longer in the sub-scan direction and shorter in the main scan direction. By positioning such a long and narrow measuring chart along the sub-scan direction at various different positions in the main scan direction, it is possible to perform the image reading position error measurement for various positions in the main scan direction (for a central portion, a front portion and a rear portion) separately.

In the above-described measuring method, it is not necessary to make those oblique lines of the measuring chart finer in order to improve the resolution of the image reading position error measurement. Thus, it is possible to use those oblique lines, each of which is wide, such that those lines may not be adversely affected by the MTF of the apparatus. By thus using the wide line pattern, the window should be enlarged. Thereby, it is possible to improve accuracy of the image reading position error measurement. In a case where the measurement is performed in real time, the width of each oblique line may be determined in consideration of balance between the data processing rate, the data storage size of buffers, and the circuit scale of the measurement system.

In the above-described examples, the center of an oblique line is obtained by calculating the center of gravity of the pixels in the window. However, it is also possible to use a wider line and obtain the position of an edge of the line in some well-known manner. Also in such a method, the image reading position error measurement can be performed in a similar manner.

Further, in the above-described methods using one or a plurality of parallel oblique lines, the state of the portion of the oblique line defined by the window is always approximately fixed as shown in FIG. 11. Thereby, the above-mentioned 'Moire' effect problem, which cannot be avoided using the test chart of the even-pitch lines arranged in the sub-scan direction in the method used in the related art described above, can be avoided in the present invention. Thus, it is possible to perform a highly accurate image reading position error measurement.

7. Data of Window and Calculation of Center of Gravity

Data of the window and calculation of the center of gravity will now be described in detail.

Figures 13, 14:
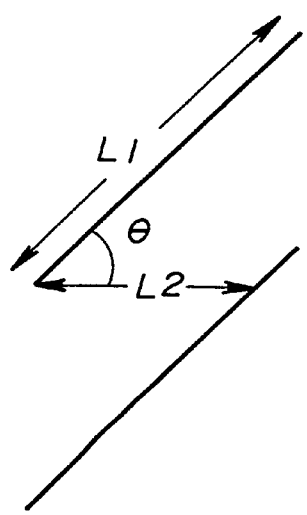
FIG. 13 illustrates read values in the window for measuring the center of gravity and a center-of-gravity measuring method.
FIG. 14 illustrates a length and an angle of an oblique line of an oblique-line pattern.

FIG. 13 shows read data values for pixels defined by the window. Each of the read data values is of 8 bits and is expressed in accordance with decimal notation (0 through 255). When calculating the center of gravity of the pixels in the window, a total of the data of the pixels is obtained for each column, for the three main scan lines. The totals of the data of the pixels are obtained for those columns, and these totals are referred to as, from the left-hand side, X0, X1, X2, X3, X4, X5, X6, X7, X8, and X9, as shown in FIG. 13, respectively. These totals are 18, 50, 202, 427, 590, 562, 345, 150, 37, and 14, respectively, as shown in the figure. Assuming that the main scan direction coordinate values of the centers of those pixels are, toward the right-hand side, 0 to 9, respectively, $$X0(Rm-0)+X1(Rm-1)+X2(Rm-2)+\ldots+X9(Rm-9)=0,$$

where 'Rm' represents the coordinate value of the center of gravity in the main scan direction, because the overall moment about the center of gravity 'Rm' is 0. Thus, the center of gravity in the main scan direction of (the data of) the pixels in the window is calculated. After applying the above-mentioned specific values of the data column totals X0, X1, X2, . . . , X9 and solving the above-mentioned equation, the center of gravity:

$$Rm=4.362.$$

is obtained.

When obtaining the center of gravity, a preceding calculation such as an interpolation operation is not needed. Therefore, this method is advantageous for simplifying the calculation process, and achieving a high-speed calculation. Instead, it is also possible to obtain the position of the oblique line image in another manner. That is, an interpolation operation is performed on the series of the data column totals X0, X1, X2, . . . , X10, and thus a data series having a predetermined resolution is obtained. From the thus-obtained data series, the position at which the peak value is present may be obtained.

8. Calculation of Center of Gravity for Chart

In a case where the image reading position error measurement is performed using a plurality of oblique lines such as those shown in FIG. 11, an operation which will be described is performed. A case will now be considered where the window is shifted from an oblique line to a subsequent oblique line, such that the window is shifted from the position Wan to the position Wan+1 shown in FIG. 11. In this case, it is assumed that the center-to-center distance in the main scan direction between the adjacent oblique lines does not correspond to an integer number of pixels. In comparison therewith, the window is shifted by an integer number of pixels. In such a case, it is necessary to correct an obtained image reading position error for a deviation of that center-to-center distance in the main scan direction between the adjacent oblique lines from an integer number of pixels, that is, a fraction portion of that distance. Thereby, it is possible to obtain the image reading position error without including an error due to such a fraction portion of that distance. For example, in the example shown in FIG. 11, it is assumed that the center of gravity of data of pixels defined by the window Wan of the oblique line Ka2 is '4.65', that is, Ran=4.65. Further, the center of gravity of the window Wan+1 of the oblique line Ka3 is '4.38', that is, Ran+1 =4.38. Similarly, the center of gravity of the window Wan+2 is Ran+2 =4.40, and the center of gravity of the window Wan+3 is Ran+3 =4.41. In this case, the difference $\Delta Ra$ of the centers of gravity due to shifting of the window between the adjacent oblique lines is obtained as follows:

$$\Delta Ra=Ran-Ran+1=4.65-4.38=0.27$$

This value $\Delta Ra$ is added to each of the values of the centers of gravity for the oblique line Ka3, and thus, the addition results are considered as the values of the centers of gravity. Then, using these values, the image reading position errors are obtained. The value Ran+2 of the window Wan+2 and the value Ran+3 of the window Wan+3 are obtained as follows:

$$Ran+2=Ran+2+\Delta Ra=4.40+0.27=4.67;$$

and $$Ran+3=Ran+3+\Delta Ra=4.41+0.27=4.68.$$

Thereby, when a plurality of oblique lines are used for the image reading position error measurement, it is possible to perform the measurement continuously through the plurality of oblique lines with high accuracy. In this case, it is necessary, when the window is shifted between the positions Wan and Wan+1 of the oblique lines Ka2 and Ka3, respectively, that those oblique lines Ka2 and Ka3 are present on the same main scan line.

FIG. 14 shows a spatial relationship between adjacent oblique lines. As shown in FIG. 14, in a case where each oblique line has a length of L1, and an angle between each oblique line and the main scan direction is $\theta$, the following equation is satisfied:

$$L2<L1\cdot\cos\theta,$$

where L2 represents a distance in the main scan direction between adjacent oblique lines. Thereby, adjacent oblique lines are present on the same scan line, that is, the bottom end of the upper oblique line of the adjacent oblique lines is lower than the top end of the lower oblique line, as shown in FIG. 14. In such a condition, it is possible to continue the image reading position error measurement through a plurality of oblique lines by shifting the window therebetween in the main scan direction. When the difference between the left-hand term (L2) and the right-hand term (L1·cos$\theta$) is larger in the above-mentioned equation, accuracy in the length L1 of each oblique line does not need to be high.

Figure 15:
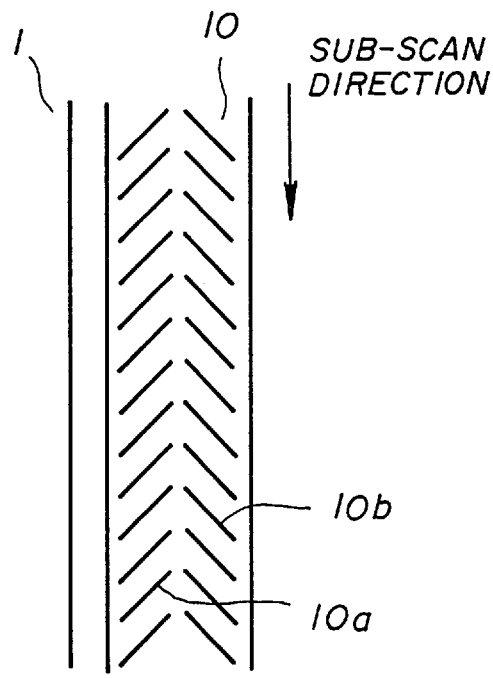
FIG. 15 shows a partial magnified view of a pattern including a plurality of 45° oblique lines opposite to each other with respect to a sub-scan direction.
Figure 16:
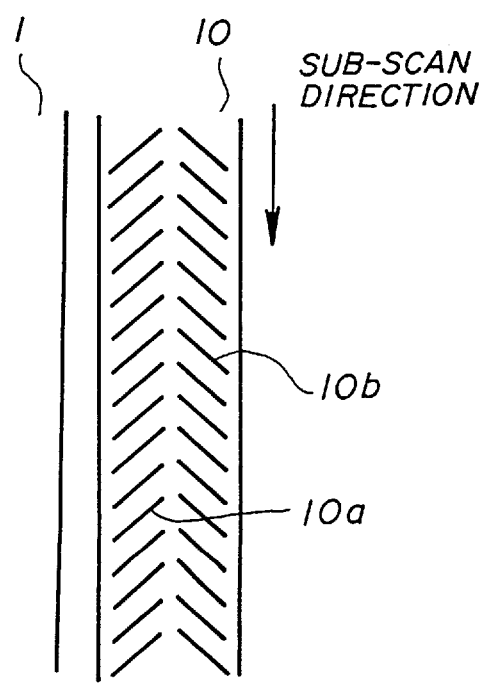
FIG. 16 shows a partial magnified view of an inclined pattern including a plurality of 45° oblique lines opposite to each other with respect to a subscan direction.
Figure 17:
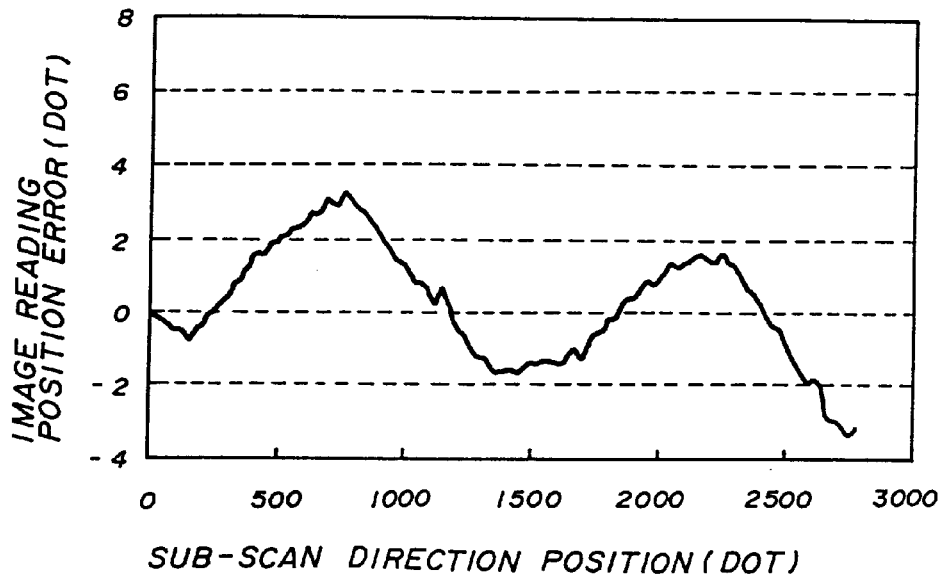
FIG. 17 shows an image reading position error measurement result obtained from the pattern shown in FIG. 15 in a condition where an average scanning speed is a predetermined value.

9. Method of Correcting Position Deviation in Image Reading Position Error 9.1 First Method FIGS. 15 and 16 show partial magnified views of examples, in each of which oblique-line patterns 10a and 10b are provided along an edge of the contact glass 1, respectively. The oblique-line patterns 10a and 10b are formed of a plurality of 45° oblique lines opposite each other with respect to the sub-scan direction. In the example of FIG. 15, in one example, the measuring chart 10 is provided in parallel to the contact glass 1. Then, this measuring chart 10 is read in a condition where the average scanning speed is a predetermined value. In this case, 45° oblique-line patterns are formed in the above-described bitmap as a result of the oblique-line patterns 10a and 10b being read. In this case, the measurement result of the image reading position errors is shown in FIG. 17. This figure shows distances, in the sub-scan direction, of actually read positions from actual positions of pixels, respectively, as image reading position errors. The unit of the graph shown in FIG. 17 is 'dot'. When the average scanning speed is the predetermined value, as shown in FIG. 17, the image reading position errors are measured with '0' as the center. In this case, no data difference is present between the left and right oblique line patterns 10a and 10b.

Figure 18:
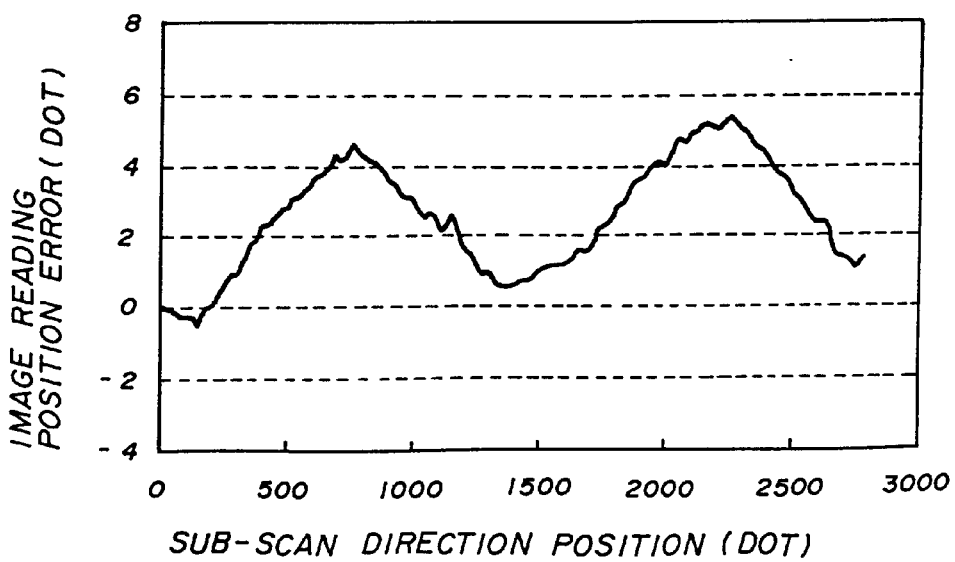
FIG. 18 shows an image reading position error measurement result obtained from the pattern shown in FIG. 15 in a condition where an average scanning speed is faster than the predetermined value.

In another case, the measuring chart 10 is provided also in parallel to the contact glass 1. Then, this measuring chart 10 is read in a condition where the average scanning speed is a little higher than the predetermined value. In this case, in the bit-map, the oblique-line patterns 10a and 10b are formed. However, each oblique line of the oblique-line patterns 10a and 10b on the bit-map has an angle larger than 45° from the sub-scan direction. In other words, the angle between each pair opposite oblique lines is enlarged. In this case, the measurement result of the image reading position errors is shown in FIG. 18. As shown in the figure, a general inclination occurs in the image reading position error measurement result. When the average scanning speed is higher than the predetermined value, the general inclination of the measurement result increases. In this case, no data difference is present between the left and right oblique-line patterns 10a and 10b.

Figure 19:
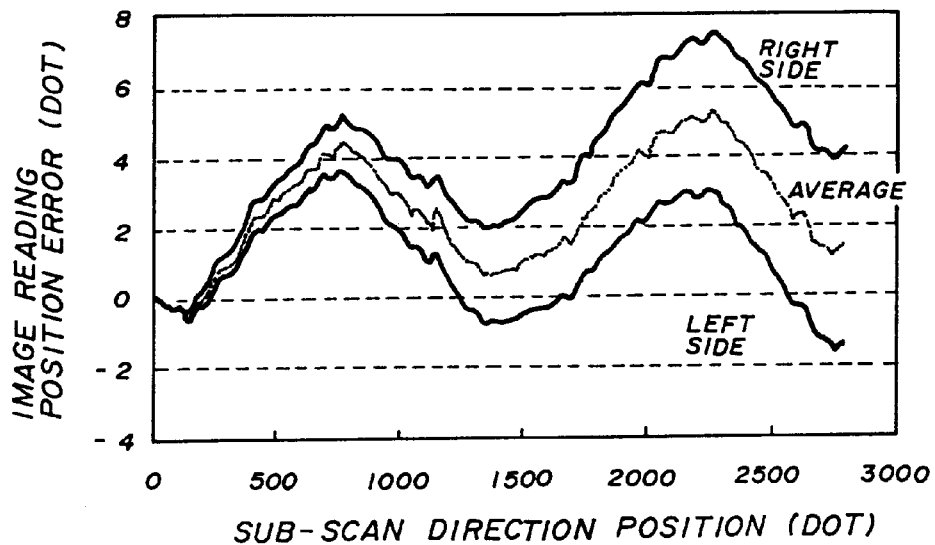
FIG. 19 shows an image reading position error measurement result obtained from the pattern shown in FIG. 16 in a condition where an average scanning speed is faster than the predetermined value.

FIG. 16 shows a case where the measuring pattern 10 is provided with an inclination with respect to the contact glass 1. Further, the average scanning speed is a little higher than the predetermined value. In this case, since the oblique-line patterns 10a and 10b incline, each oblique line of the left oblique-line pattern 10a has an angle smaller than 45° with respect to the sub-scan direction while each oblique line of the right oblique-line pattern 10b has an angle larger than 45° with respect to the sub-scan direction. In this case, the measurement result of the image reading position errors is shown in FIG. 19. In the figure, the left oblique-line pattern 10a is measured as if the scanning speed is slower than the actual speed as the angle of each oblique line is smaller than 45° with respect to the sub-scan direction, while the right oblique-line pattern 10b is measured as if the scanning speed is higher than the actual speed as the angle of each oblique line is large than 45° with respect to the sub-scan direction. As a result, the measurement result has a larger general inclination for the right oblique-line pattern 10b while the measurement result has a smaller general inclination for the left oblique-line pattern 10a. Accordingly, by averaging the image reading position error data obtained from the left oblique-line pattern 10a and the image reading position error data obtained from the right oblique-line pattern 10b, the general inclinations of the two measurement results are canceled out. As a result, independent of an inclination of the measuring chart 10, the correct image reading position error can be obtained.

Thus, by using the oblique patterns 10a and 10b having the oblique lines opposite to each other and extending at 45° from the measuring chart longitudinal axis for the image reading position error measurement, it is possible to separate the measured value into the component due to the deviation of the scanning speed and the component due to the deviation of the position of the measuring chart 10. Further, by averaging the image reading position errors obtained from the right and left oblique-line patterns 10b and 10a, the image reading position errors can be accurately measured, even if the position of the measuring chart 10 is deviated.

Figure 20:
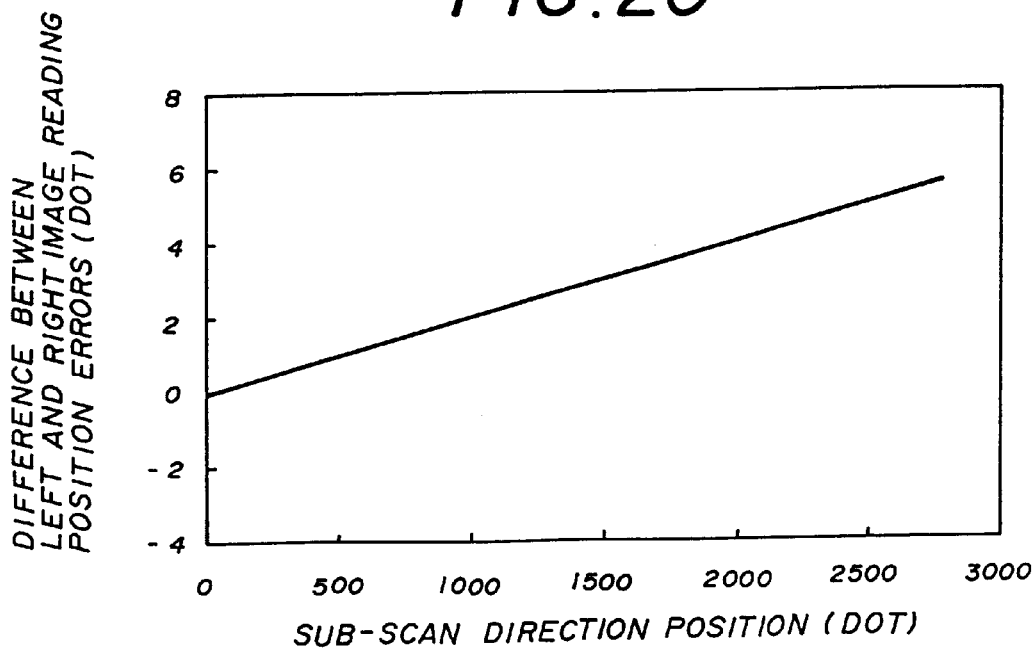
FIG. 20 shows a result of subtracting the image reading position error data which is measured using a right oblique-line pattern from the image reading position error data which is measured using a left oblique-line pattern, shown in FIG. 19.

FIG. 20 shows a result of subtracting the image reading position error data which is measured using the right oblique-line pattern lob from the image reading position error data which is measured using the left oblique-line pattern 10a shown in FIG. 19. This represents the inclination of the measuring chart 10. Thus, by obtaining the difference between the image reading position errors measured from the oblique patterns 10a and 10b having the oblique lines opposite to each other and extending at 45° from the measuring chart longitudinal axis, the position deviation amount of the measuring chart 10 can be detected.

9.2 Second Method

Thus, in the first method, the position deviation amount of the measuring pattern 10 can be obtained. Ordinarily, this position deviation amount does not vary. Accordingly, in the second method, the position deviation amount of the measuring chart shown in FIG. 20 is stored in the storage portion 108. Then, in an ordinary image reading operation, any one of the oblique-line patterns 10a and 10b is used and the image reading position errors are measured. Then, using the position deviation amount of the measuring chart, the thus-obtained image reading position error is corrected.

10. Window Setting Method

Figure 21:
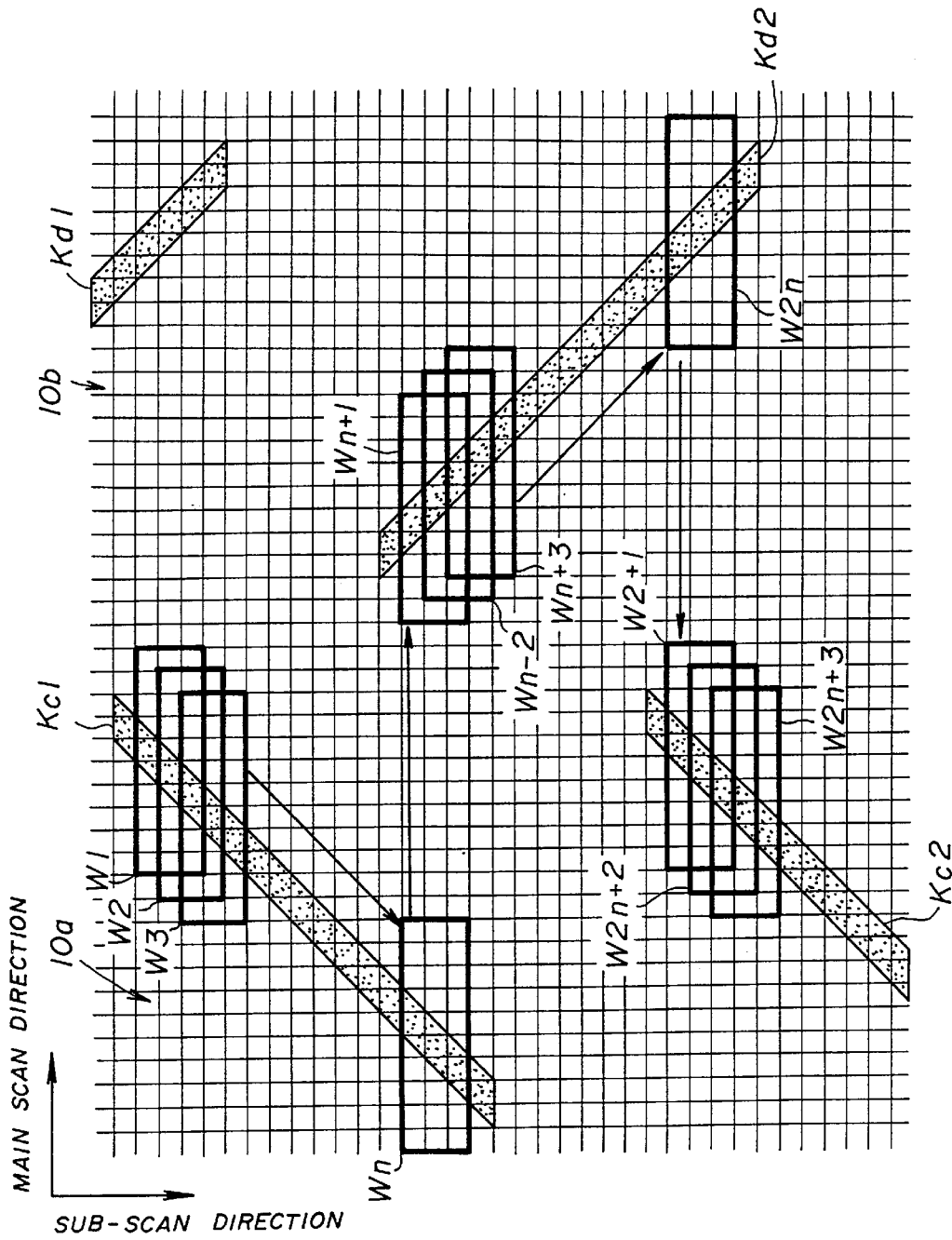
FIG. 21 illustrates read data on a bit-map obtained from another example of the measuring chart, and a 10-pixel-by-3-pixel window for measuring the image reading position errors using a plurality of oblique lines.

A case where a plurality of 45° oblique lines which are opposite to each other with respect to the sub-scan direction are formed as shown in FIG. 21 will now be described. How to set the window in the position error measuring portion 105 will first be described.

FIG. 21 shows the plurality of oblique lines in the bit-map of FIG. 5, and also shows a 10-pixel-by-3-pixel size window for measuring the image reading position errors using these oblique lines. First, a case where the image reading position errors are obtained from the oblique line Kc1 of the left oblique line pattern 10a will be described. In order to obtain the position of the data in the window, the center of gravity in the main scan direction is obtained. The window is shifted as W1 →W2 →W3 in the oblique bottom-left 45° direction in sequence. At this time, control is performed so that the window always includes the oblique line Kc1. Then, when the window has reached a predetermined main-scan-direction address, in this case, when the window has reached the position Wn, the window is moved in the main scan direction to reach the position Wn+1 of the oblique line Kd2 of the right oblique-line pattern 10b. The window is moved as Wn+1→Wn+2→Wn+3 in the oblique bottom-right 45° direction in sequence.

Similarly, for the oblique line Kd2 of the right oblique-line pattern 10b, when the window has reached a predetermined main-scan-direction address, in this case, when the window has reached the position W2n, the window is moved in the direction reverse to the main scan direction to reach the position W2n+1 of the oblique line Kc2 of the left oblique-line pattern 10a. The window is moved as W2n+1→W2n+2→W2n+3 in the oblique bottom-left 45° direction in sequence.

The center of gravity of the window W is calculated for each position of the window W. Thus, the left and right oblique patterns 10a and 10b are alternately measured. As a result, in comparison to the control of window described with reference to FIG. 11, operation processing is simple and the image reading position errors can be obtained with a short operation time.

The compensation of the position deviation of the measuring chart 10 will be now described.

Figure 22:
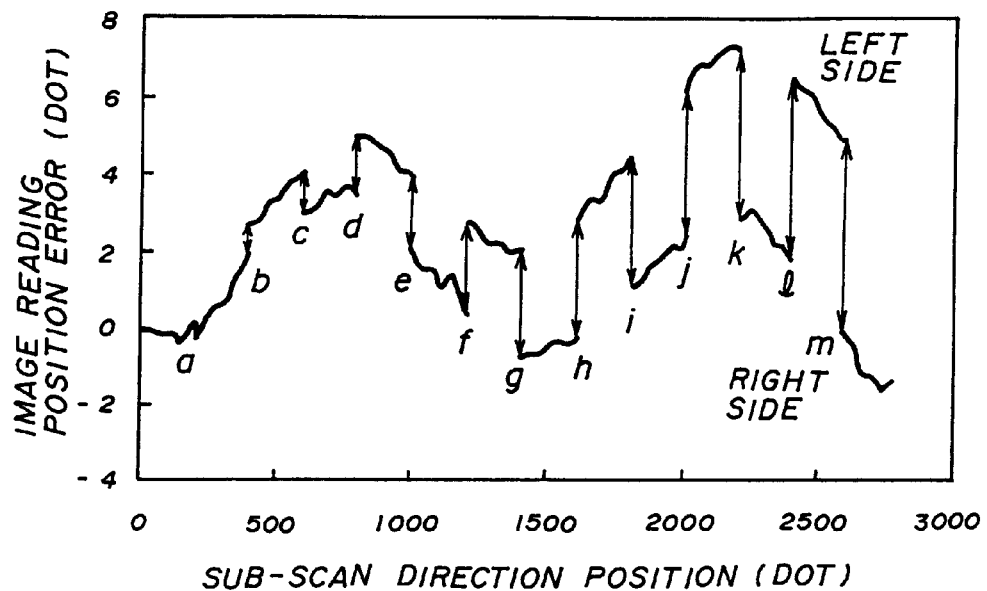
FIG. 22 shows image reading position errors obtained from left and right oblique patterns shown in FIG. 21, respectively.
Figure 23:
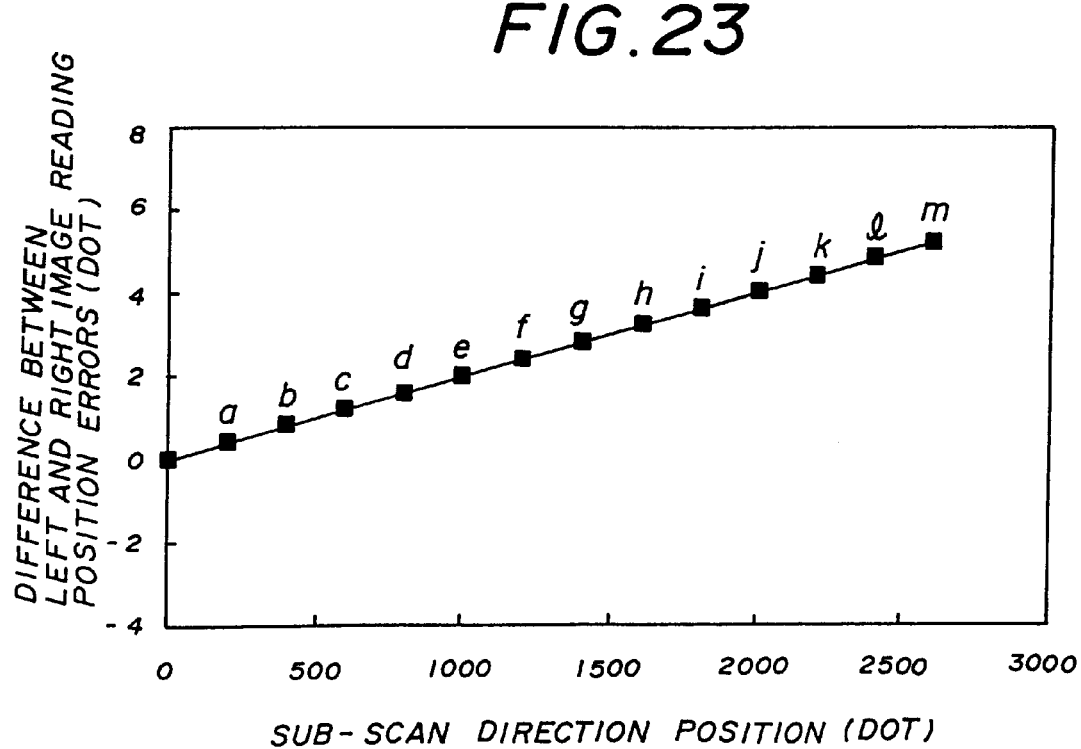
FIG. 23 shows a result of performing linear approximation on differences between the image reading position errors each time when the window moves to a subsequent oblique line in the left and right oblique patterns.

When the image reading position errors are obtained in accordance with the above-described control of the window, the measuring result shown in FIG. 22 is obtained. At this time, the difference of the image reading position errors occurring when the window moves in the main scan direction and the direction reverse to the main scan direction is obtained. Specifically, the difference between the image reading position errors of the left and right oblique-line patterns 10a and 10b occurring in the positions 'a', 'b', 'c', . . . 'm' is obtained. FIG. 23 shows the result after performing linear approximation on the thus-obtained differences. The inclination of the line shown in FIG. 23 represents the position deviation of the measuring chart 10. Using the values of the line shown in FIG. 23, the corrected true image reading position errors can be obtained.

11. Noise Removing Method

Figure 24:
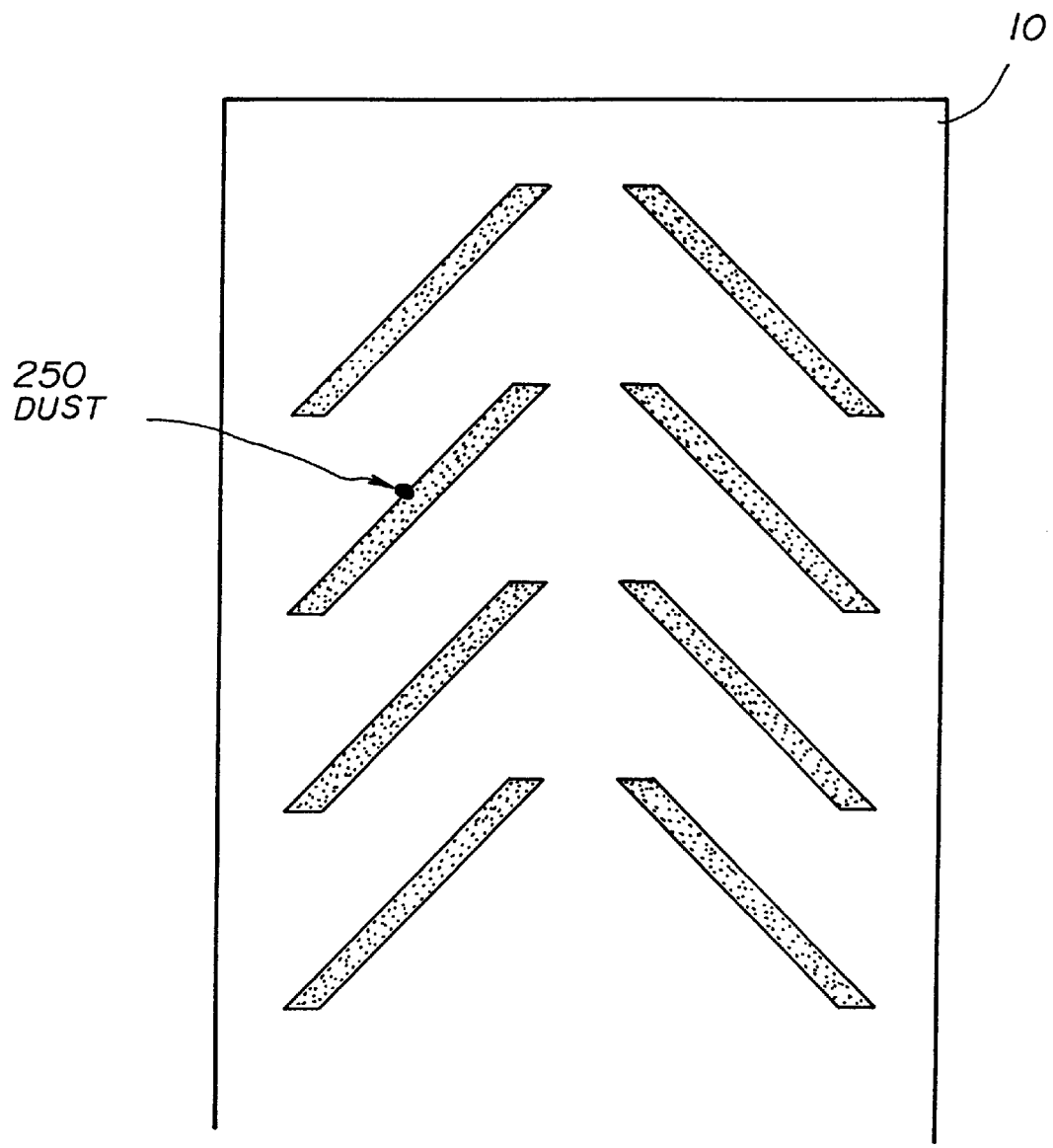
FIG. 24 illustrate a case where a piece of dust adheres to the oblique-line pattern.
Figure 25:
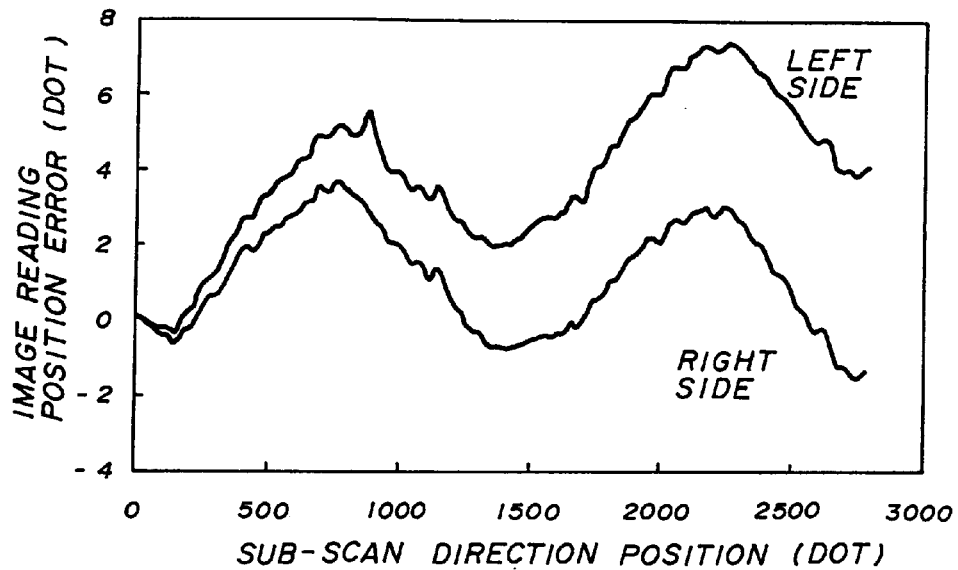
FIG. 25 shows measurement results of the image reading position errors obtained from the left oblique-line pattern to which the dust adheres as shown in FIG. 24 and the right oblique-line pattern, respectively.

In a case where dust or a flaw is present on the measuring chart 10, noise occurs when the image reading position error measurement is performed. FIG. 24 shows an example where a piece of dust 250 is adhered to the left oblique-line pattern 10a. FIG. 25 shows the image reading position errors obtained from the left and right oblique-line patterns 10a and 10b. The difference between the image reading position errors of the left and right oblique-line patterns 10a and 10b is shown in FIG. 27.

Figure 26:
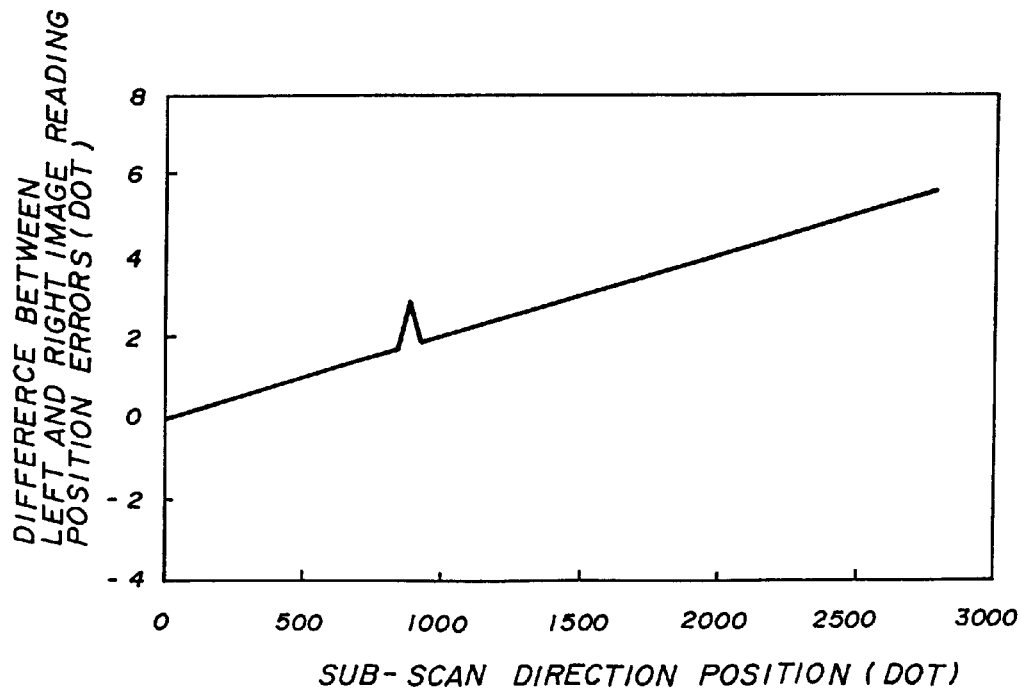
FIG. 26 shows the difference between the measurement results of FIG. 25.
Figure 27:
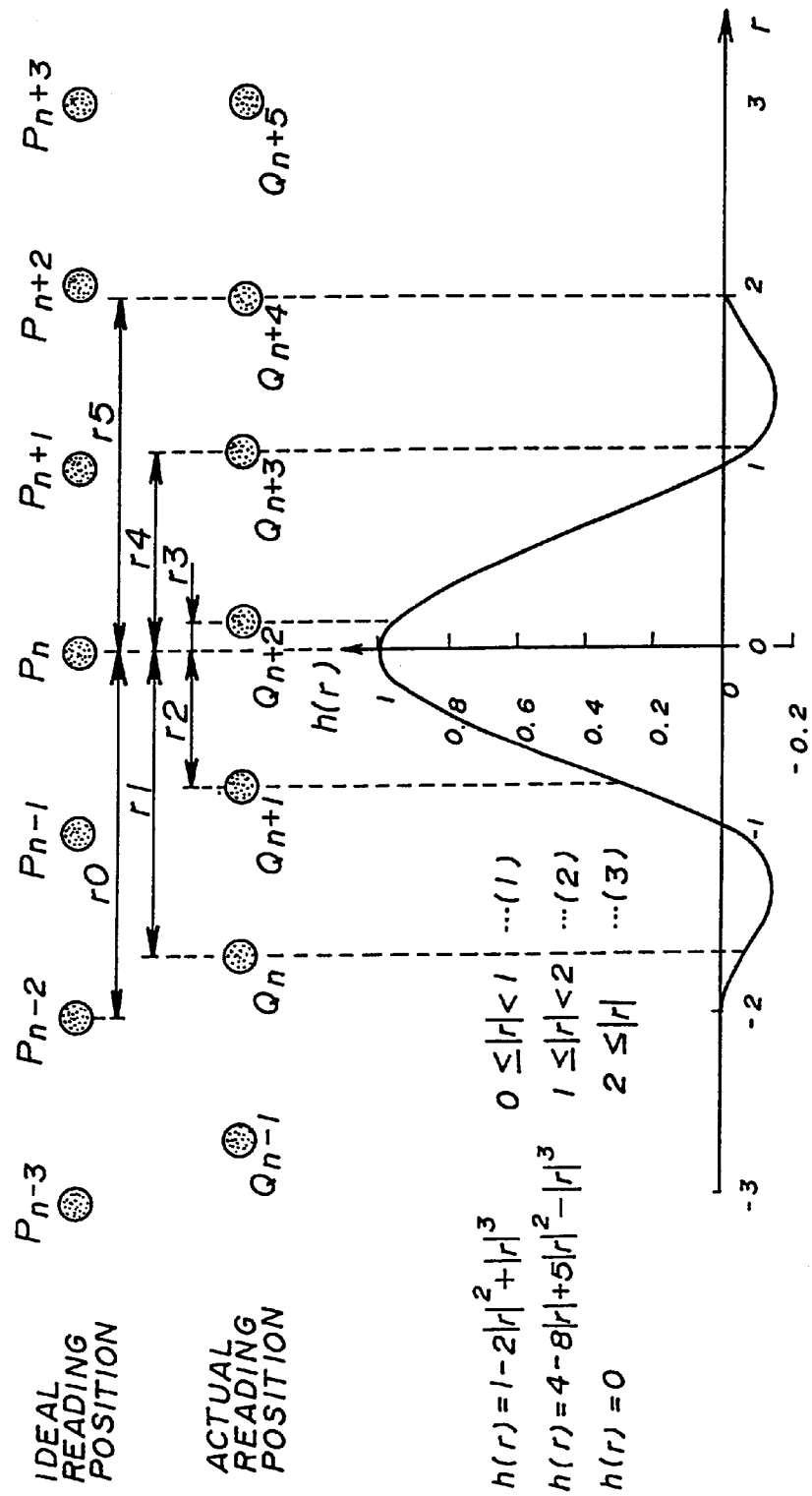
FIG. 27 shows a model of image reading position error correction using a cubic function convolution method.

As shown in FIG. 27, by obtaining the difference between the image reading position errors of the left and right oblique-line patterns 10a and 10b, when noise occurs, a peak appears at the position of the noise. Thereby, the position at which the dust is adhered and the noise amount can be obtained. For example, in FIG. 26, data which is apart from the other data by a distance larger than a predetermined value is determined to be noise and the noise portion is removed. Thereby, high S/N image reading position error measurement can be achieved.

12. Position Error Correcting Operation

The image reading position error correcting operation, performed by the position error correcting portion 106 shown in FIG. 4 will now be described with reference to FIGS. 27, 28, 29A and 29B.

Figure 28:
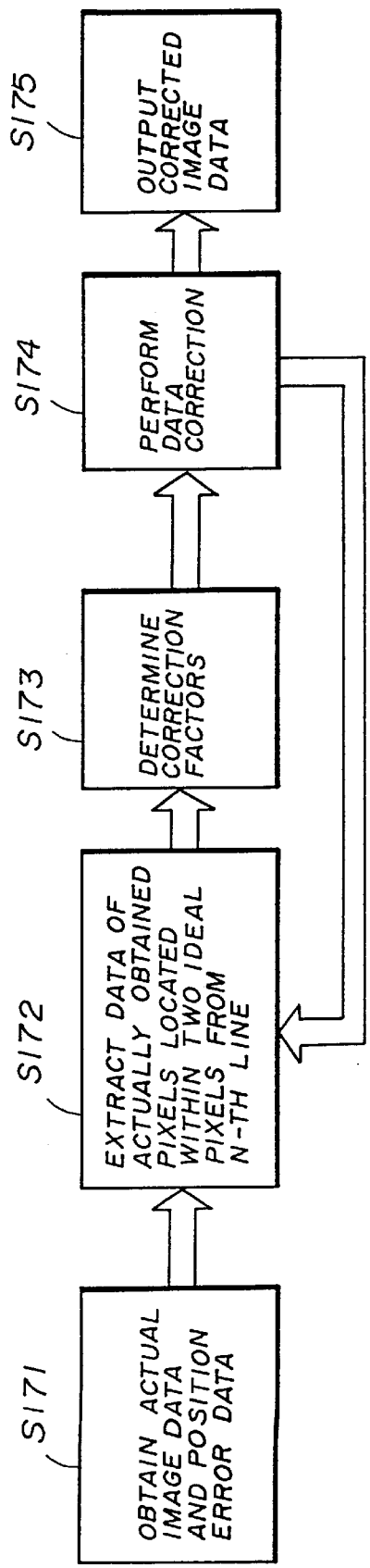
FIG. 28 shows a flowchart indicating a processing procedure of the correction method of FIG. 27.

In the embodiment, the cubic function convolution method is used for the image reading position error correcting operation. FIG. 27 illustrates that correction operation using the cubic function convolution method, and FIG. 28 shows an operation flow of the correction. Positions $P_{n-3}$, $P_{n-2}$, $P_{n-1}$, $P_n$, $P_{n+1}$, $P_{n+2}$ and $P_{n+3}$ represent ideal reading pixel positions when reading an original image through the image reading apparatus in an ideal condition. This ideal condition is such that no scanning speed variation occurs in the reading operation performed by the light-to-electricity converting portion 101. Specifically, the reading carriage (such as the above-mentioned first carriage) of the light-to-electricity converting portion 101 for scanning the original image so as to read it moves in a precisely fixed speed. In the ideal condition, as shown in FIG. 27, those pixel positions are arranged in an even-pitch manner or with equal adjacent distances. Positions $Q_{n-1}$, $Q_n$, $Q_{n+1}$, $Q_{n+2}$, $Q_{n+3}$, $Q_{n+4}$ and $Q_{n+5}$ represent actual reading pixel positions when reading the original image through the image reading apparatus in an actual condition. This actual condition is such that some scanning speed variation occurs in the reading operation performed by the light-to-electricity converting portion 101. Specifically, the reading carriage of the light-to-electricity converting portion 101 moves in a varying speed. In the actual condition, as shown in FIG. 27, those pixel positions are arranged in an uneven-pitch manner or with unequal adjacent distances. Further, those pixel positions in the actual condition are deviated from the pixel positions in the ideal condition, respectively. For example, the actual reading pixel position $Q_n$ should be located at the ideal reading pixel position $P_n$.

In such a case, those position deviations in the sub-scan direction can be measured by the position error measurement portion 105. As described above, from an error of the center of gravity in the main scan direction measured in the image reading position error measurement, such an image reading position error (deviation) can be obtained. In fact, when the scanning speed varies, the oblique line in the bit-map formation of the obtained image data is deviated from the oblique line 'a' to the oblique line image 'b' shown in FIG. 5, for example. Such a deviation is measured by obtaining an error of the center of gravity in the main scan direction of the data defined by the windows W.

Using the thus-obtained image reading position errors in the sub-scan direction, for example, correct image data (tone data) of the pixel $P_n$ which is present on a n-th main scan line is estimated from the actually obtained image data of some of the pixel positions $Q_{n-1}$, $Q_n$, $Q_{n+1}$, $Q_{n+2}$, $Q_{n+3}$, $Q_{n+4}$ and $Q_{n+5}$ according to the cubic function convolution method.

In this method, in S171, image data of actually obtained pixels and image reading position error data is obtained in the portions 101, 102, 103, 104 and 105 of the image reading apparatus shown in FIG. 4. Then, in S172, therefrom, image data of actually obtained pixels which are located within distances of two ideal pixels (r0 and r5 shown in FIG. 27) from the position ($P_n$) of the n-th main scan line, and image reading position error data therefor is extracted. In the case of FIG. 27, image data and error data of the actually obtained pixels $Q_n$, $Q_{n+1}$, $Q_{n+2}$, $Q_{n+3}$ and $Q_{n+4}$ are extracted in S172. The reason why the pixels within the distances of two ideal pixels (r0 and r5) from the position of the n-th main scan line are used is that correction factors are treated to be 0 for data of pixels apart from the position of the n-th main scan line farther than two ideal pixels. A predetermined interpolation function h(r) is used, and, a distance r from the reference (ideal) pixel position $P_n$ and an actually obtained pixel position Q is applied to the interpolation function, and thus a value h(r) is obtained, in S173. The thus-obtained value h(r) is used as the correction factor. The interpolation function h(r) is, according to divisional cubic polynomial approximation of sinx/x, as follows:

$$h(r)=1-2|r|^2+|r|^3 \qquad (1),$$

where $0 \le |r| < 1$;

$$h(r)=4-8|r|+5|r|^2-|r|^3 \qquad (2),$$

where $1 \le |r| < 2$; and $$h(r)=0 \qquad (3),$$

where $2 \le |r|$.

Then, such a correction factor is obtained for the image data for each pixel of the pixels $Q_n$, $Q_{n+1}$, $Q_{n+2}$, $Q_{n+3}$ and $Q_{n+4}$ extracted in S172, by applying respective distances r (r1, r2, r3, r4 and r5) from the ideal pixel position $P_n$. Thus, the correction factors h(r1), h(r2), h(r3), h(r4) and h(r5) are obtained for the pixels $Q_n$, $Q_{n+1}$, $Q_{n+2}$, $Q_{n+3}$ and $Q_{n+4}$, in S173. Those correction factors are used as weights for the actually obtained image data of the pixels $Q_n$, $Q_{n+1}$, $Q_{n+2}$, $Q_{n+3}$ and $Q_{n+4}$. Thus, the correct image data of the pixel $P_n$ is estimated by the following equation (11):

$$P_n=\{Q_n\cdot h(r1)+Q_{n+1}\cdot h(r2)+Q_{n+2}\cdot h(r3)+Q_{n+3}\cdot h(r4)+Q_{n+4}\cdot h(r5)\}/\{h(r1)+h(r2)+h(r3)+h(r4)+h(r5)\} \qquad (4),$$

where the image data of the pixels $P_n$, $Q_n$, $Q_{n+1}$, $Q_{n+2}$, $Q_{n+3}$ and $Q_{n+4}$ are represented by $P_n$, $Q_n$, $Q_{n+1}$, $Q_{n+2}$, $Q_{n+3}$ and $Q_{n+4}$, respectively.

Thus, the correct image data of the pixel $P_n$ is calculated. A similar operation is performed for each pixel $P_n$ on the n-th main scan line. Then, the main scan line to be processed is shifted into the (n+1)th main scan line. Then, for the (n+1)th main scan line, a similar operation is performed. Thus, using the image reading position errors, which are measured by the position error measuring portion 105 as described above, the correct image data, which should be obtained when the original image reading is performed with correct reading pixel positions without reading carriage speed variation, is estimated. Thus, the image data error due to image reading position error is corrected, and, thus, the image reading position error correction operation is performed on all the main scan lines, in S174. The thus-obtained image data is output in S175. In the above-described operation, the calculation of the correction factors h(r) and the calculations of the reciprocal of the total of the correction factors in the equation (4) need to be performed once when performing the image reading position error correction operation for each main scan line.

Figure 29A:
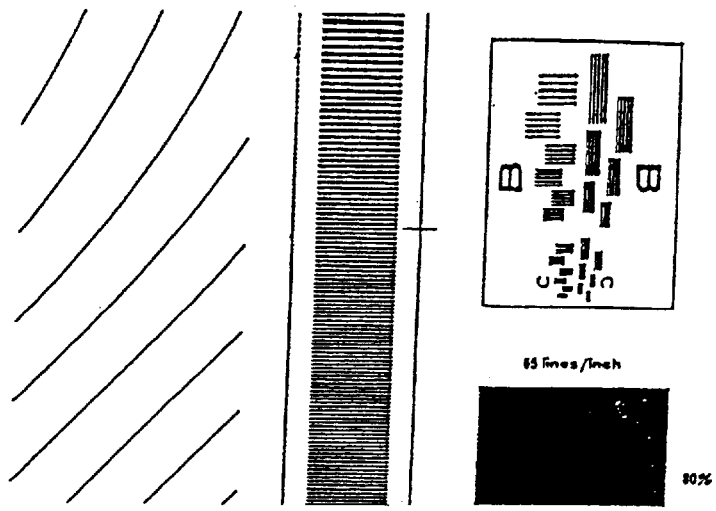
FIGS. 29A and 29B show a sample image before undergoing the image reading position error correction and after undergoing the image reading position error correction.
Figure 29B:
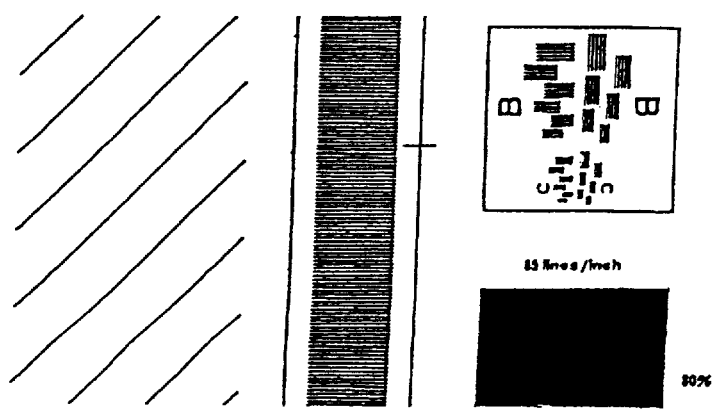

FIGS. 29A and 29B show states, as an example, of a bit-map formation of obtained image data, before and after performing such image reading position error correction. Ordinarily, actual original image reading of the image reading apparatus is performed after it is determined that the reading carriage scanning speed reaches a fixed speed. However, in this example, in order to show image reading position errors remarkably, the original image reading operation starts immediately after the reading carriage starts to move. In this case, 45° oblique lines are read together with other images. In each of FIGS. 29A and 29B, a left-hand portion indicates the read oblique lines. Using the oblique lines, the image reading position errors are measured as described above, the thus-obtained error data is used and, thus, the image reading position error correction described above is performed. As a result, the images shown in FIG. 29B are obtained. Those images shown in FIG. 29B are, with a high accuracy, similar to the original images which were read by the image reading apparatus first as mentioned above. In contrast thereto, in FIG. 29A, in a top area, because the reading carriage speed has not reached the fixed speed, the images are elongated vertically, and also the oblique lines are oblique more steeply. Thus, an amount of image reading position error is large there. Thus, even if an original image reading is performed with a large amount of image reading position error, images which are, with a high accuracy, similar to the original images can be obtained as a result of performing the image reading position error correction according to the present invention.

13. Computer Control

Figure 30:
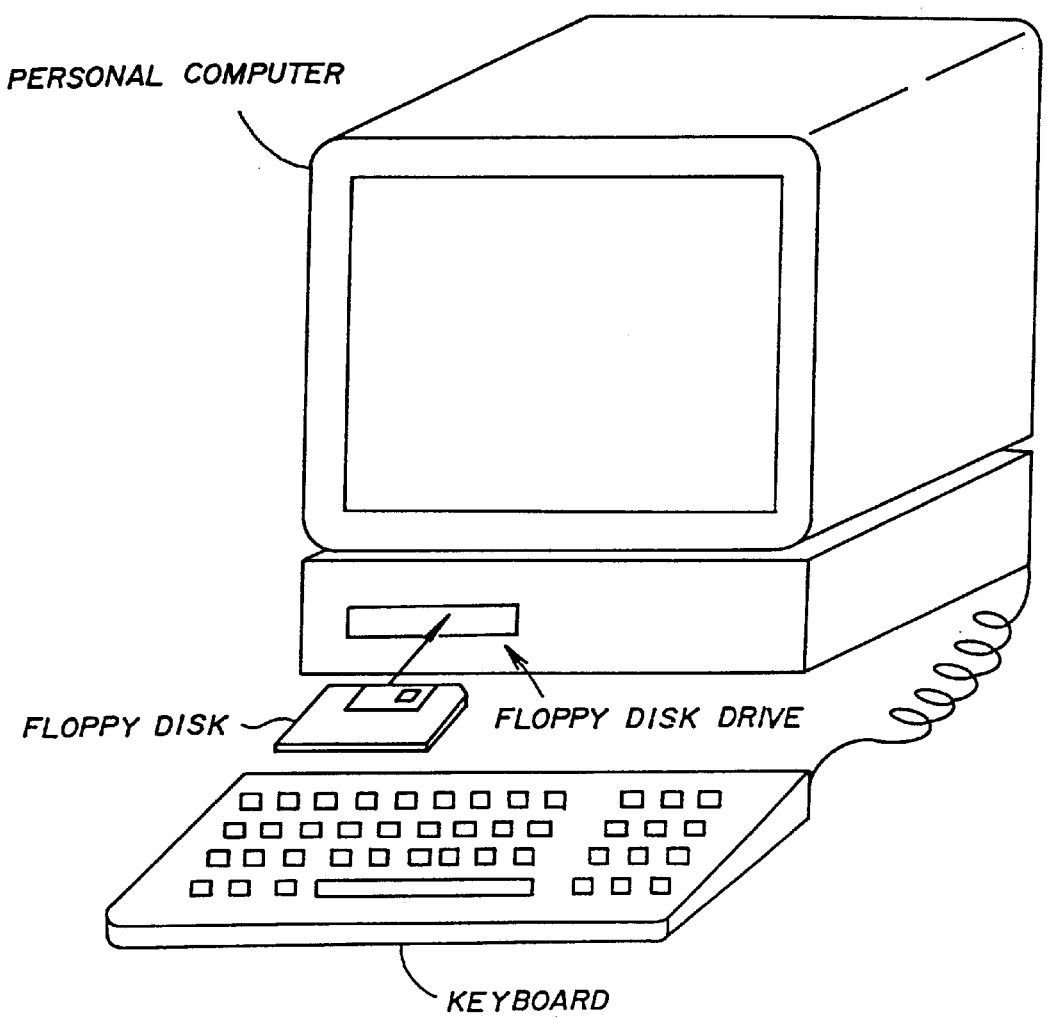
FIG. 30 shows a personal computer which can be used in the present invention.

As shown in FIG. 30, a general-purpose computer such as a personal computer shown in FIG. 30 can be used for performing the above-described image reading position error measuring operation which is otherwise performed by said position error measuring portion 105 shown in FIG. 4 and the position error correcting operation which is otherwise performed by said position error correcting portion 106 shown in FIG. 5. The general-purpose computer is specifically configured by software (stored in any information storage medium such as a floppy disk shown in FIG. 30) executed thereby to carry out the above-described image reading position error measuring operation and position error correcting operation.

14. Variant Example

A variant example of the above-described embodiment of the present invention will now be described.

Figure 31:
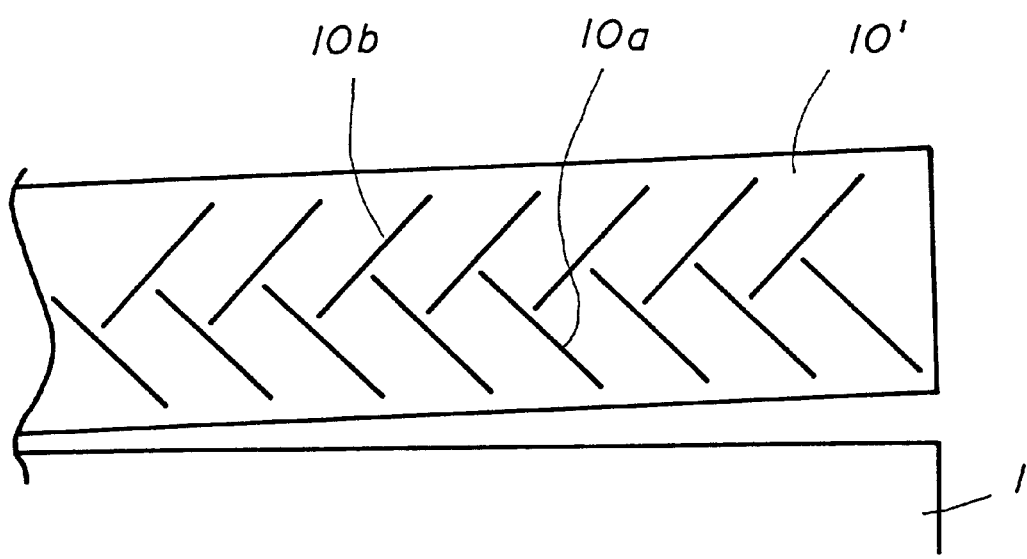
FIG. 31 shows a magnified view of a measuring chart and a contact glass in a variant example.

The difference between the above-described embodiment and the variant example is that the measuring chart 10 of the above-described embodiment is such as that shown in FIG. 3 while the measuring chart 10' of the variant embodiment is such as that shown in FIG. 31. All the other arrangement and functions/operations of the image reading apparatus in the variant embodiment may be the same as that of the image reading apparatus in the above-described embodiment.

In the measuring chart 10', as shown in FIG. 31, the left and right oblique-line patterns 10a an 10b overlap with one another, and an inner end of each oblique line faces and is in proximity to a middle portion of the opposite oblique line.

Figure 32:
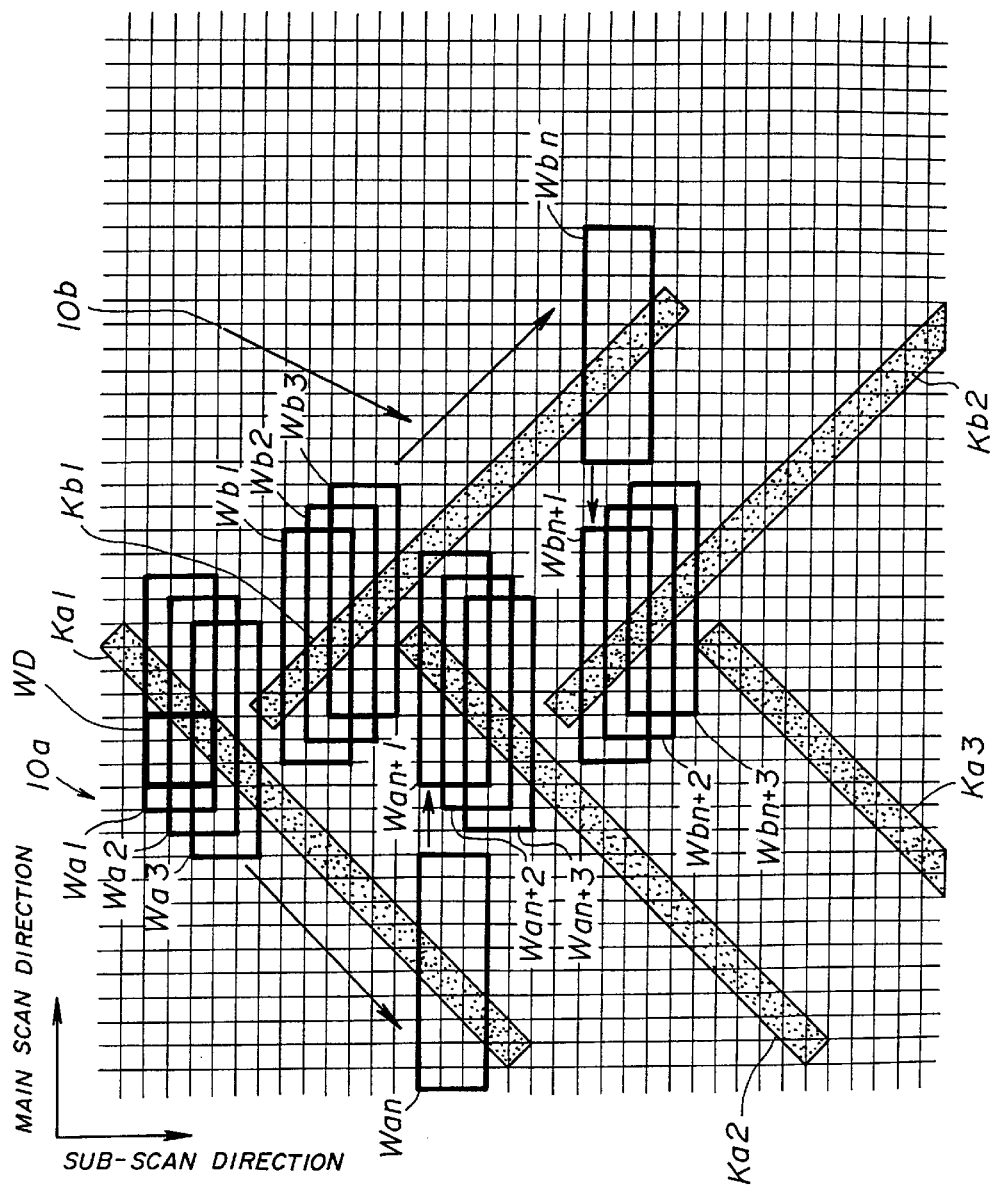
FIG. 32 illustrates windows for measuring the centers of gravity in the variant example.

With reference to FIG. 32, in comparison to FIG. 11, movement of the window in the variant embodiment is similar to the movement of the window in the above-described embodiment. Almost all of the above descriptions with reference to FIG. 11 can be themselves used as descriptions with reference to FIG. 32.

Figure 33:
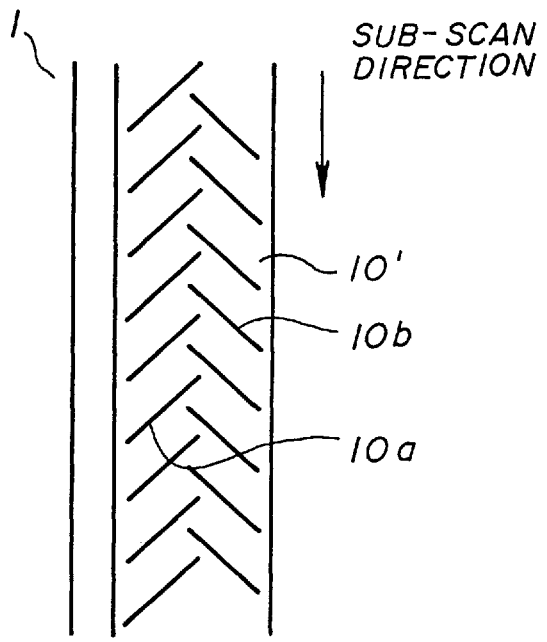
FIG. 33 shows a partial magnified view of a pattern including a plurality of 45° oblique lines opposite to each other with respect to a sub-scan direction in the variant example.
Figure 34:
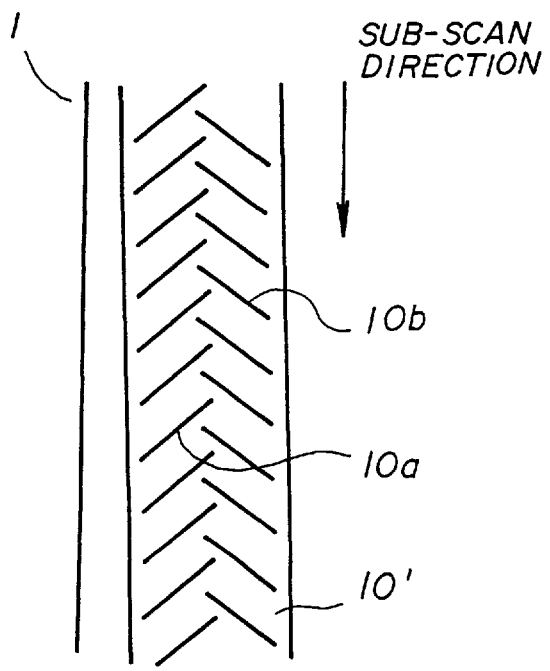
FIG. 34 shows a partial magnified view of an inclined pattern including a plurality of 45° oblique lines opposite to each other with respect to a subscan direction in the variant example.

In the variant example, FIGS. 15 and 16 of the above-described embodiment are replaced with FIGS. 33 and 34, respectively. All of the above descriptions with reference to FIGS. 15 and 16 can be themselves used as descriptions with reference to FIGS. 33 and 34.

Figure 35:
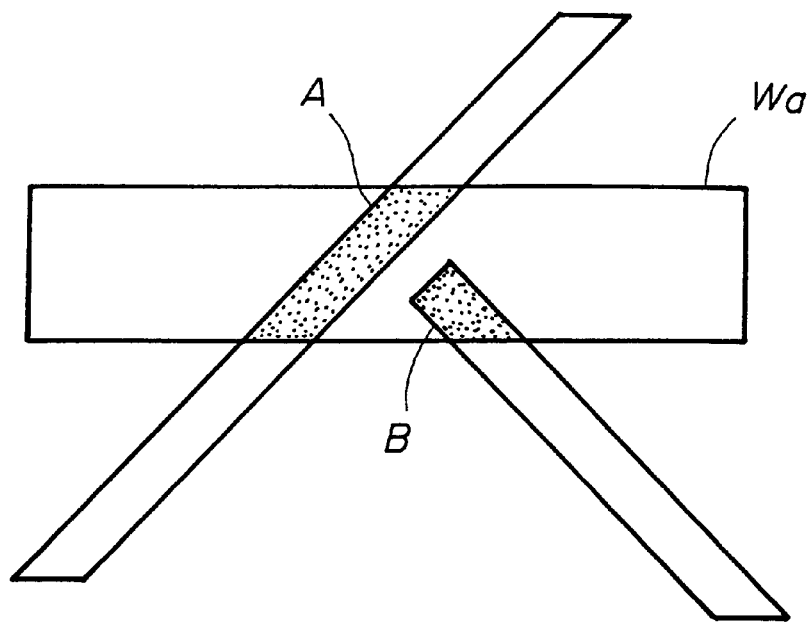
FIG. 35 illustrates a state in which the window includes the two adjacent oblique lines which are inclined in different directions.

In a case where dust or a flaw is present on the measuring chart 10', noises occurs when the image reading position error measurement is performed. Further, when the window Wa is positioned as shown in FIG. 35, although the center of gravity of the portion A of the left oblique line of the oblique-line pattern 10a should be calculated, the portion B of the right oblique line of the oblique-line pattern 10b is present in the window Wa. Thus, it is necessary to cause the image data of the portion B to be 0.

Figure 36:
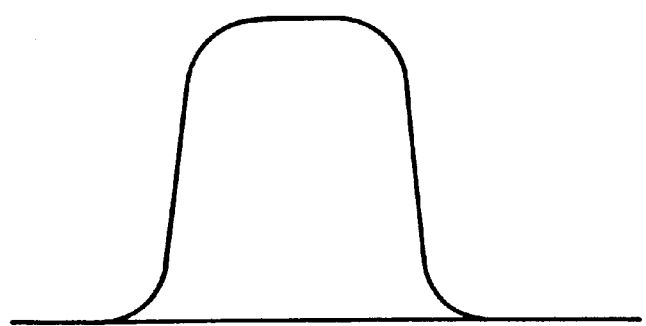
FIG. 36 shows image data obtained from reading the oblique line along the main scan line.

The data of the main scan line when reading the oblique line, as shown in FIG. 36, simply increases at one edge and simply decreases at the opposite side edge. By using this characteristic, the central position of the oblique line is obtained. Then, the image data which is located apart from the central position farther than a predetermined distance is to be 0.

Another method is to remove isolated points. The width of the oblique line is fixed. Accordingly, when the distance of image data from the simple increase position to the simple decrease position is less than that of the oblique line, this simple data is determined to be an isolated point and is removed. When the distance of image data from the simple increase position to the simple decrease position is equal to that of the oblique line, it is determined that the situation shown in FIG. 35 occurs. Then, when the image reading position error for the left oblique line is obtained, the image data of the right oblique line is caused to be 0. Thereby, it is possible to reduce noises and measurement accuracy can be improved.

Figure 37:
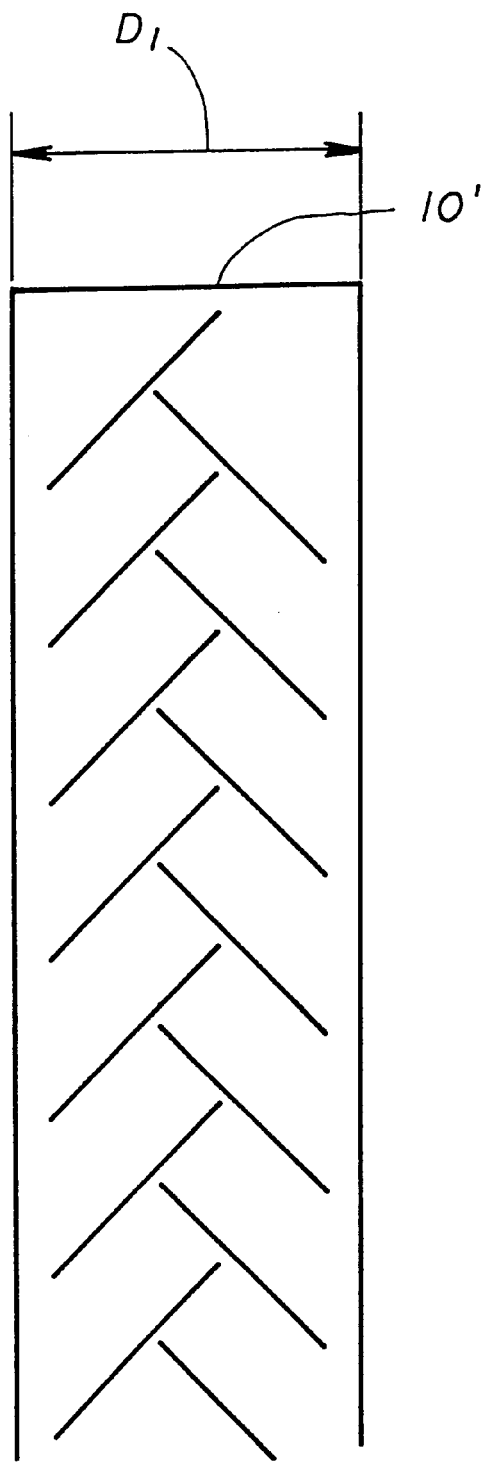
FIG. 37 shows a magnified view of the oblique-line patterns in the variant example.
Figure 38:
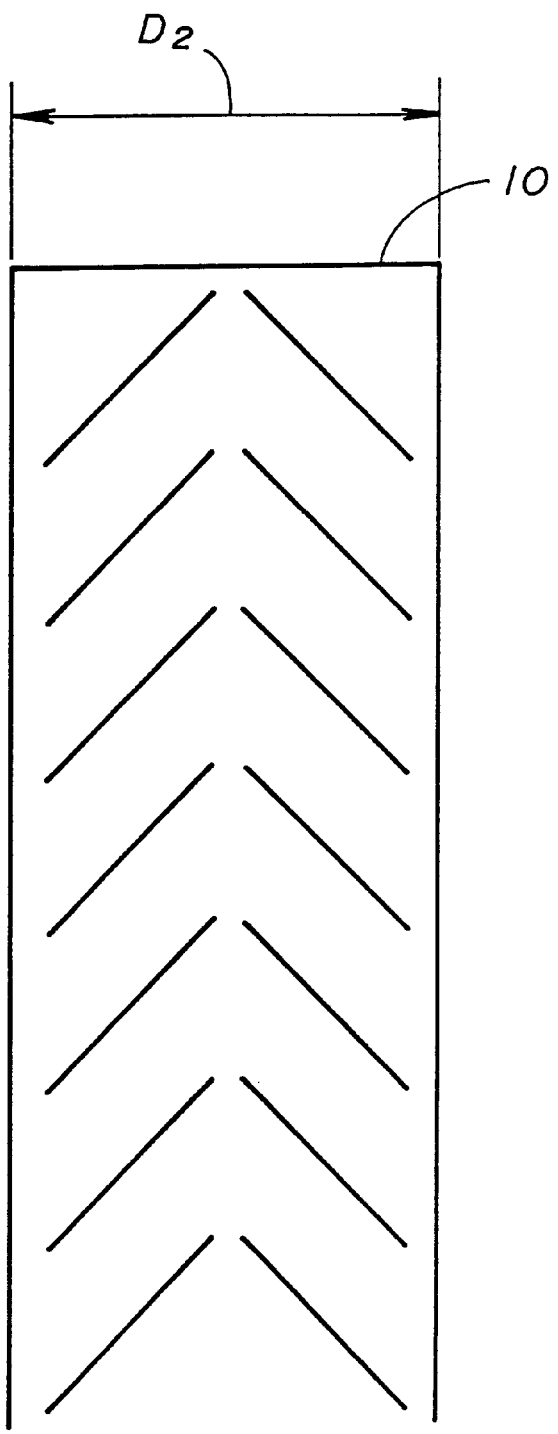
FIG. 38 shows a magnified view of the oblique-line patterns in the embodiment of the present invention.

FIG. 37 shows the oblique patterns of the variant example in which the oblique patterns overlap with one another. FIG. 38 shows the oblique patterns of the above-described embodiment in which the oblique patterns do not overlap with one another. As is obvious from the comparison of the figures, for the measuring chart 10 in the above-described embodiment, a width D2 of a CCD row is needed, while for the measuring chart 10' in the variant example, a shorter width D1 of the CCD row is needed. Accordingly, although a number of CCDs corresponding to (D2−D1) is eliminated, reading of the oblique patterns can be sufficiently performed. Thereby, the cost of the eliminated CCDs can be reduced.

Further, the present invention is not limited to the above-described embodiments, and variations and modifications may be made without departing from the scope of the present invention claimed in the following claims.

What is claimed is:

1. An image reading apparatus which reads an original image by scanning said original image, main scan line by main scan line, with a fixed time interval, said apparatus comprising:

first and second patterns which are located outside of an image reading area, a first pattern comprising a plurality of lines each extending at a fixed angle with respect to a sub-scan direction, a second pattern comprising a plurality of lines each extending at a fixed angle but having a reverse direction with respect to the sub-scan direction;

reading means for reading said first and second patterns;

measuring means for measuring first and second image reading position errors corresponding to different angle oblique lines of said first and second patterns of image data obtained as a result of reading said first and second patterns, respectively;

compensating means for compensating for position deviations of said first and second patterns using said first and second image reading position errors, and obtaining position-deviation-compensated image reading position errors; and correction means for correcting image data read by said reading means using said position-deviation-compensated image reading position errors.

2. The image reading apparatus according to claim 1, further comprising:

means for obtaining said first image reading position errors from said first pattern;

means for obtaining said second image reading position errors from said second pattern;

means for obtaining a difference between said first and second image reading position errors; and means for storing said difference between said first and second image reading position errors;

wherein, in ordinary image reading, one of said first and second patterns is used for measuring the image reading position errors, and, based on said difference between said first and second image reading position errors which was stored in said storing means, position deviation of said first and second patterns is compensated for.

3. The image reading apparatus according to claim 1, further comprising:

means for obtaining said first image reading position errors from said first pattern;

means for obtaining said second image reading position errors from said second pattern;

means for setting a window at a position so that said window includes a first pattern portion on a bit-map of image data obtained from reading said first pattern, when image reading position error measurement is started from said first pattern;

means for moving said window by an integer number of pixels in sequence along said first pattern portion so as to newly set said window;

means for newly setting said window at a position so that said window includes a second pattern portion on the bit-map of image data obtained from reading said second pattern, as a result of moving said window in a main scan direction when said window has reached a predetermined position;

means for calculating the position of the pattern portion in said window each time when said window is newly set; and means for obtaining said first and second image reading position errors by calculating a change of the position of the pattern portion in said window through each movement of said window.

4. The image reading apparatus according to claim 1, further comprising;

means for obtaining said first image reading position errors from said first pattern;

means for obtaining said second image reading position errors from said second pattern;

means for comparing said first and second image reading position errors with one another and obtaining a difference between said first and second image reading position errors; and means for determining that a noise is present when said difference between said first and second image reading position errors is significantly large locally, and removing said noise.

5. An image reading apparatus which reads an original image by scanning said original image, main scan line by main scan line, with a fixed time interval, said apparatus comprising:

first and second patterns which are located outside of an image reading area, a first pattern comprising a plurality of lines each extending at a fixed angle with respect to a sub-scan direction, a second pattern comprising a plurality of lines each extending at a fixed angle but having a reverse direction with respect to the sub-scan direction;

an image reading portion which reads said first and second patterns as well as said original image;

a position error measuring portion which measures first and second image reading position errors corresponding to different angle oblique lines of image data obtained as a result of reading said first and second patterns, respectively, said position error measuring portion compensating for position deviations of said first and second patterns using said first and second image reading position errors, and obtaining position-deviation-compensated image reading position errors; and a position error correcting portion which corrects image data obtained as a result of said image reading portion reading said original image, using said position-deviation-compensated image reading position errors.

6. A computer program product for measuring image reading position errors in image data which is obtained as a result of scanning an original image, main scan line by main scan line, with a fixed time interval, and correcting said image data using said image reading position errors, said measuring of said image reading errors using first and second patterns which are located outside of an image reading area, a first pattern comprising a plurality of lines each extending at a fixed angle with respect to a sub-scan direction, a second pattern comprising a plurality of lines each extending at a fixed angle but having a reverse direction with respect to the sub-scan direction, said computer program product comprising a computer usable medium having computer readable program code means embodied in said medium, said computer program code means comprising:

program code means for causing a computer to measure first and second image reading position errors corresponding to different angle oblique lines of image data obtained from reading said first and second patterns, respectively;

program code means for causing said computer to correct position deviations of said first and second patterns using said first and second image reading position errors, and obtaining position-deviation-corrected image reading position errors; and program code means for causing said computer to correct image data read by said image reading apparatus, using said position-deviation-corrected image reading position errors.

7. A computer-implemented method for measuring image reading position errors in image data which is obtained as a result of scanning an original image, main scan line by main scan line, with a fixed time interval, and correcting said image data using said image reading position errors, said measuring of said image reading errors using first and second patterns which are located outside of an image reading area, a first pattern comprising a plurality of lines each extending at a fixed angle with respect to a subscan direction, a second pattern comprising a plurality of lines each extending at a fixed angle but having a reverse direction with respect to the subscan direction, said computer-implemented method comprising the steps of;

a) measuring first and second image reading position errors corresponding to different angle oblique lines of image data obtained from reading said first and second patterns, respectively;

b) compensating for position deviations of said first and second patterns using said first and second image reading position errors, and obtaining position-deviation-compensated image reading position errors; and c) correcting image data read by said image reading apparatus, using said position-deviation-compensated image reading position errors.

* * * * *